United States Patent
Sakamoto et al.

(10) Patent No.: US 11,303,766 B2
(45) Date of Patent: Apr. 12, 2022

(54) INFORMATION PROCESSING APPARATUS, CONTROL METHOD, AND NON-TRANSITORY COMPUTER-READABLE MEDIUM

(71) Applicant: CANON KABUSHIKI KAISHA, Tokyo (JP)

(72) Inventors: Hirokazu Sakamoto, Tokyo (JP); Hiroyuki Sanami, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/896,018

(22) Filed: Jun. 8, 2020

(65) Prior Publication Data

US 2020/0396349 A1 Dec. 17, 2020

(30) Foreign Application Priority Data

Jun. 14, 2019 (JP) .............................. JP2019-111368

(51) Int. Cl.
| | |
|---|---|
| *H04N 1/00* | (2006.01) |
| *H04N 1/32* | (2006.01) |
| *H04W 4/80* | (2018.01) |
| *G06F 3/0488* | (2022.01) |

(52) U.S. Cl.
CPC ..... *H04N 1/00411* (2013.01); *H04N 1/00315* (2013.01); *H04N 1/32545* (2013.01); *G06F 3/0488* (2013.01); *H04W 4/80* (2018.02)

(58) Field of Classification Search
CPC .................................................. H04N 1/00411
USPC .............................................. 358/1.15, 1.13
See application file for complete search history.

(56) References Cited

U.S. PATENT DOCUMENTS

| | | | |
|---|---|---|---|
| 2013/0208312 A1* | 8/2013 | Morita .................. | G06F 1/1698 358/1.15 |
| 2014/0145988 A1 | 5/2014 | Ishizawa | |
| 2015/0304478 A1* | 10/2015 | Kim ........................ | H04W 4/80 455/414.3 |
| 2018/0070202 A1 | 3/2018 | Mujibiya et al. | |
| 2018/0074594 A1* | 3/2018 | Herz ....................... | G06F 3/017 |

(Continued)

FOREIGN PATENT DOCUMENTS

JP    2019-046102 A    3/2019

*Primary Examiner* — Jacky X Zheng
(74) *Attorney, Agent, or Firm* — Canon U.S.A., Inc. IP Division

(57) ABSTRACT

A computer of an information processing apparatus is caused to execute steps, the steps including a first specification step of specifying a first direction of a position of a communication apparatus with respect to a position of the information processing apparatus based on communication between the information processing apparatus and the communication apparatus through a predetermined communication method; a reception step of receiving a predetermined operation for designating a direction from a user; a second specification step of specifying a second direction corresponding to the received predetermined operation; a third specification step of specifying the communication apparatus corresponding to the second direction from among a plurality of the communication apparatuses present in a vicinity of the information processing apparatus based on the first direction and the second direction; and an execution step of executing a process relating to the communication apparatus corresponding to the second direction.

14 Claims, 15 Drawing Sheets

(56) References Cited

U.S. PATENT DOCUMENTS

2018/0341841 A1* 11/2018 Tokumoto .......... G06K 15/4095
2020/0379702 A1* 12/2020 Abe .................... G06F 1/1626
2020/0394007 A1* 12/2020 Ono .................... G06F 3/1221

* cited by examiner

FIG. 12

| Service UUID | Service NAME | Characteristic UUID | Characteristic NAME | Service READABLE | Service WRITABLE | Characteristic READABLE | Characteristic WRITABLE | Characteristic INDICATABLE | VALUE | PAIRING REQUIRED |
|---|---|---|---|---|---|---|---|---|---|---|
| 0x1801 | GATT Service | 0x2A05 | Service Changed | | | | | O | 0 | |
| | | 0x2B2A | Database Hash | O | | O | | | F0 CA 2D 48 EC F5 8B AC 8A AA 30 BB B9 FB A9 90 | |
| 0x180A | Device Information | 0x2A29 | Manufacturer Name String | | | O | | | Printer Device | |
| | | 0x2A24 | Hardware Revision String | O | | O | | | 1010_AAA | |
| | | 0x2A25 | Firmware Revision String | | | O | | | 2030000 | |
| | | 0x2A26 | Software Revision String | O | | O | | | 0001 | |
| 00000000-0000-1000-1000-0040059b34fb | IJ Original | 00000000-0000-2000-1000-0040059b34fb | SSID | | | O | | | Printer SSID | O |
| | | 00000000-0000-2000-1000-0040059b34fc | PASSWORD | | | O | | | aaaabbbb | O |

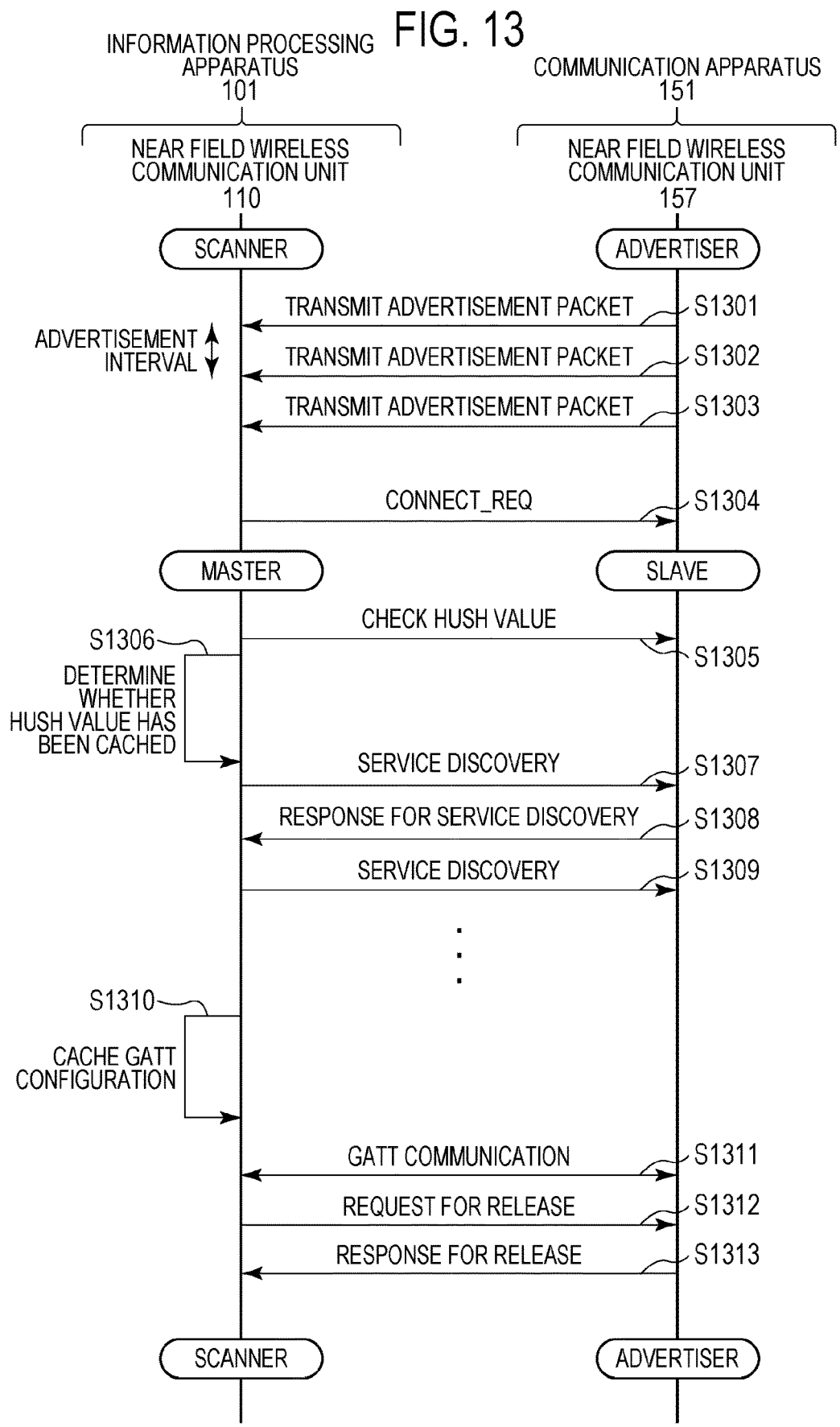

INFORMATION PROCESSING APPARATUS, CONTROL METHOD, AND NON-TRANSITORY COMPUTER-READABLE MEDIUM

BACKGROUND

Field

The present disclosure relates to an information processing apparatus, a control method, and a non-transitory computer-readable medium.

Description of the Related Art

There is known an embodiment in which a user designates a communication apparatus relating to a process that is executed by an information processing apparatus. Japanese Patent Application Laid-Open No. 2019-046102 discloses a technology in which a user selects a communication apparatus to be controlled by a voice control device using a mobile terminal.

In this case, it is desired to improve convenience of an operation designated by a user for a communication apparatus relating to a process that is executed by an information processing apparatus.

SUMMARY

An aspect of the disclosure causes a computer of an information processing apparatus to execute steps, the steps including a first specification step of specifying a direction of a position of a communication apparatus with respect to a position of the information processing apparatus based on communication between the information processing apparatus and the communication apparatus through a predetermined communication method; a first reception step of receiving a predetermined operation for designating a direction from a user; a second specification step of specifying a direction corresponding to the received predetermined operation; a third specification step of specifying the communication apparatus corresponding to the specified direction corresponding to the predetermined operation from among a plurality of the communication apparatuses present in a vicinity of the information processing apparatus based on the specified direction of the position of the communication apparatus and the specified direction corresponding to the predetermined operation; and an execution step of executing a process relating to the communication apparatus corresponding to the specified direction corresponding to the predetermined operation.

Further features will become apparent from the following description of exemplary embodiments with reference to the attached drawings.

BRIEF DESCRIPTION OF THE DRAWINGS

FIG. 12 is a table indicating an example of a configuration of GATT data.

FIG. 13 is a sequence diagram indicating a process when the information processing apparatus and the communication apparatus are connected through the BLE communication method.

DESCRIPTION OF THE EMBODIMENTS

An exemplary embodiment is described below with reference to the drawings. Note that, for the disclosure, it is to be understood that a configuration obtained by properly changing and improving an embodiment, which is described later, is included in the scope of the present disclosure without departing from the idea of the disclosure based on an ordinary knowledge of a person skilled in the art.

First Embodiment

An information processing apparatus and a communication apparatus included in a communication system according to the present embodiment are described. An example of the information processing apparatus is a smart phone in the present embodiment; however, it is not limited thereto. The information processing apparatus can be applied to any one of various configurations, such as a mobile terminal, a notebook PC, a tablet terminal, a personal digital assistant (PDA), a digital camera, and the like. Moreover, an example of the communication apparatus is a printer in the present embodiment; however, it is not limited thereto. The communication apparatus can be applied to any one of various configurations that can make wireless communication with the information processing apparatus. For example, in the case of printer, the communication apparatus can be applied to an ink jet printer, a full-color laser beam printer, or a monochrome printer. Without limited to the printer, the communication apparatus can be applied to any one of a copier, a facsimile apparatus, a mobile terminal, a smart phone, a notebook PC, a tablet terminal, a PDA, a digital camera, a music reproducing device, a television set, and the like. For another example, the communication apparatus can be applied to a multi-function machine including a copy function, a facsimile function, a print function, and so forth.

Figure 1:
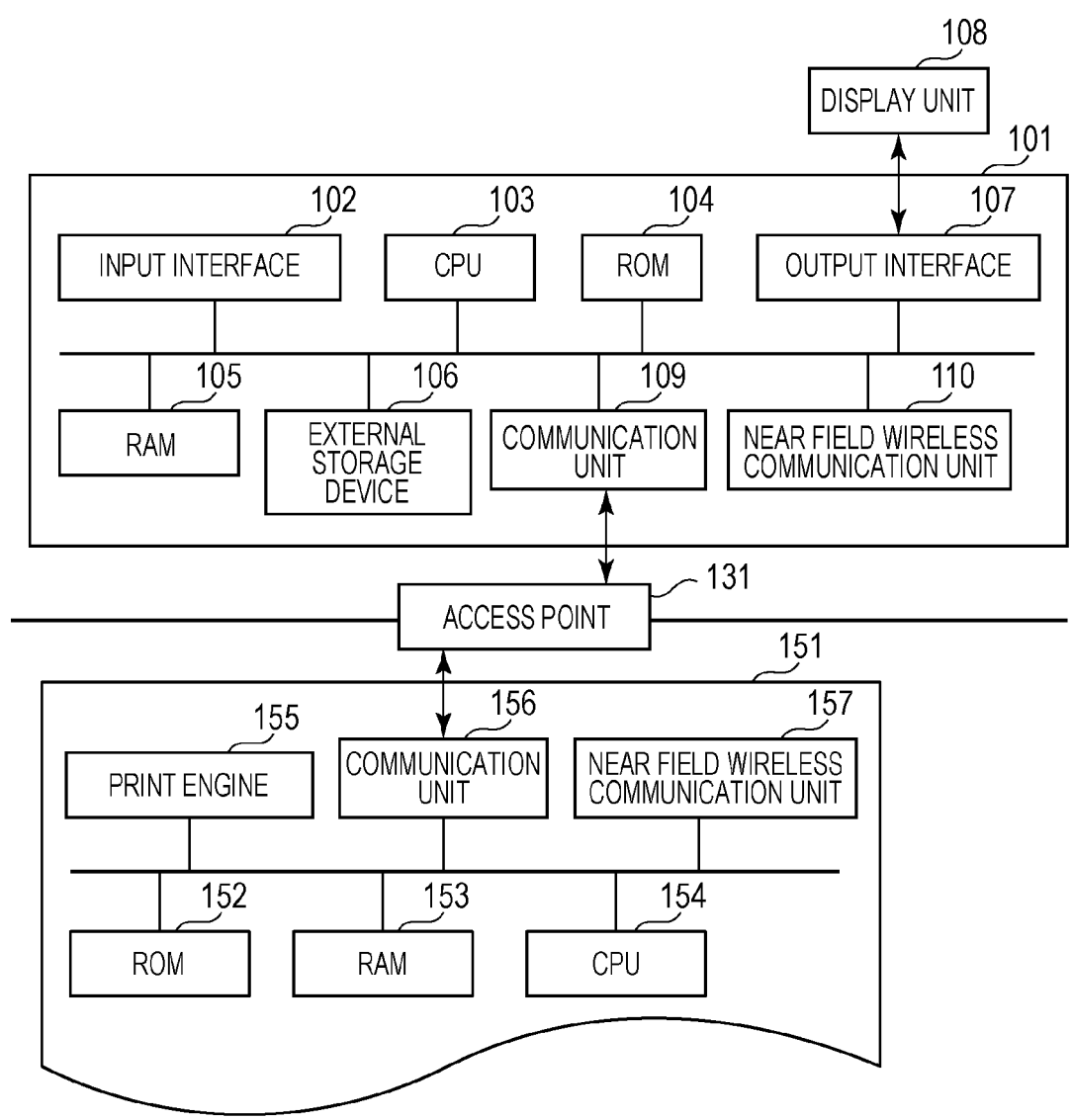
FIG. 1 is an exemplary illustration of configurations of an information processing apparatus according to an embodiment of the present disclosure and a communication apparatus.

First, the configurations of the information processing apparatus according to the present embodiment, and the communication apparatus communicable with the information processing apparatus according to the present embodiment are described below with reference to the block diagram in FIG. 1. The present embodiment is described based on the following configuration as an example; however, the present embodiment can be applied to an apparatus capable of communicating with a communication apparatus, and hence the function thereof is not particularly limited to the illustrated function.

An information processing apparatus 101 is an information processing apparatus according to the present embodiment. The information processing apparatus 101 includes an input interface 102, a central processing unit (CPU) 103, a read-only memory (ROM) 104, a random access memory (RAM) 105, an external storage device 106, an output interface 107, a display unit 108, a communication unit 109, and a near field wireless communication unit 110. The CPU 103, the ROM 104, the RAM 105, and so forth, form a computer of the information processing apparatus 101.

The input interface 102 is an interface for receiving an input of data or an action instruction from a user, and includes a physical keyboard, a button, a touch panel, or the like. The output interface 107 (described later) and the input interface 102 may have the same configuration and may output a screen and receive an operation from the user using the same configuration.

The CPU 103 is a system control unit and controls the entire information processing apparatus 101.

The ROM 104 stores fixed data, such as a control program that is executed by the CPU 103, a data table, and a built-in operating system (hereinafter, referred to as OS) program. In the present embodiment, each control program stored in the ROM 104 performs software execution control, such as scheduling, task switching, and interrupting, under the management by the built-in OS stored in the ROM 104.

The RAM 105 includes a static random access memory (SRAM) that requires a backup power supply. The RAM 105 holds data using a primary battery for data backup (not illustrated), and hence can store important data such as a program control variable without being volatilized. The RAM 105 has a memory area that stores, for example, setting information of the information processing apparatus 101 and management data of the information processing apparatus 101. The RAM 105 is also used as a main memory and a work memory of the CPU 103.

The external storage device 106 stores, for example, an application that provides a print execution function and a print information generation program that generates print information that can be interpreted by a communication apparatus 151. The external storage device 106 also stores various programs such as an information transmission/reception control program that transmits and receives information to and from the communication apparatus 151 connected via the communication unit 109, and various information to be used by the programs.

The output interface 107 is an interface to perform control so that the display unit 108 displays data and makes a notification about the condition of the information processing apparatus 101.

The display unit 108 includes a light-emitting diode (LED) or a liquid crystal display (LCD), and displays data and makes a notification about the condition of the information processing apparatus 101. On the display unit 108, a software keyboard including keys, such as numeric input keys, a mode setting key, an enter key, a delete key, and a power key may be provided to receive an input from the user via the display unit 108.

The communication unit 109 is connected to an apparatus such as the communication apparatus 151 and executes data communication. For example, the communication unit 109 can be connected to an access point (not illustrated) in the communication apparatus 151. When the communication unit 109 is connected to the access point in the communication apparatus 151, the information processing apparatus 101 and the communication apparatus 151 are communicable with each other. Note that the communication unit 109 may communicate with the communication apparatus 151 directly by wireless communication, or through an external access point (access point 131) located outside the information processing apparatus 101 and the communication apparatus 151. Examples of wireless communication method include Wireless Fidelity (Wi-Fi, registered trademark) and Bluetooth (registered trademark). The access point 131 may be, for example, a device such as a wireless local area network (LAN) router. In the present embodiment, a scheme in which the information processing apparatus 101 is directly connected to the communication apparatus 151 without through an external access point is referred to as direct connection scheme. A scheme in which the information processing apparatus 101 is connected to the communication apparatus 151 through an external access point is referred to as infrastructure connection scheme.

The near field wireless communication unit 110 is a configuration that is wirelessly connected to an apparatus such as the communication apparatus 151 at close range to execute data communication, and that makes communication by a communication method different from that of the communication unit 109. The near field wireless communication unit 110 can be connected to a near field wireless communication unit 157 in the communication apparatus 151. In the present embodiment, it is assumed to use Bluetooth5.1 as a communication method of the near field wireless communication unit 110. Bluetooth5.1 includes both standards of Classic Bluetooth and Bluetooth low energy (BLE). In the present embodiment, it is assumed to use BLE as a communication method of the near field wireless communication unit 157.

The communication apparatus 151 is the communication apparatus according to the present embodiment. The communication apparatus 151 includes a ROM 152, a RAM 153, a CPU 154, a print engine 155, a communication unit 156, and the near field wireless communication unit 157.

The communication unit 156 has, as an access point in the communication apparatus 151, an access point for connection to an apparatus such as the information processing apparatus 101. The access point is connectable to the communication unit 109 of the information processing apparatus 101. Note that the communication unit 156 may communicate with the information processing apparatus 101 directly by wireless communication, or through the access point 131.

Examples of wireless communication method include Wi-Fi (registered trademark) and Bluetooth (registered trademark). The communication unit 156 may include hardware that functions as an access point, or may operate as an access point using software to function as an access point.

The near field wireless communication unit 157 is a configuration that is wirelessly connected to an apparatus such as the information processing apparatus 101 at close range. In the present embodiment, it is assumed to use Bluetooth5.1 as the communication method of the near field wireless communication unit 157. More specifically, in the present embodiment, it is assumed to use BLE as the communication method of the near field wireless communication unit 157.

The RAM 153 includes a SRAM that requires a backup power supply. The RAM 153 holds data using a primary battery for data backup (not illustrated), and hence can store important data such as a program control variable without being volatilized. The RAM 153 has a memory area that stores, for example, setting information of the communication apparatus 151 and management data of the communication apparatus 151. The RAM 153 is also used as a main memory and a work memory of the CPU 154. The RAM 153 stores a reception buffer for temporarily storing print information received from the information processing apparatus 101 or the like, and stores various information.

The ROM 152 stores fixed data, such as a control program that is executed by the CPU 154, a data table, and an OS program. In the present embodiment, each control program stored in the ROM 152 performs software execution control, such as scheduling, task switching, and interrupting, under the management by the built-in OS stored in the ROM 152.

The CPU 154 is a system control unit and controls the entire communication apparatus 151.

An image is formed on a recording medium such as a sheet of paper using a recording agent such as an ink, based on information stored in the print engine 155 or the RAM 153 or a print job received from the information processing apparatus 101 or the like, and a print result is output. At this time, the print job transmitted from the information processing apparatus 101 or the like has a large transmission data amount, and requires high-speed communication. Thus, the print job is received via the communication unit 156 that is communicable at a higher speed than the near field wireless communication unit 157 does.

The communication apparatus 151 may have mounted thereon a memory, such as an external hard disk drive (HDD) or a secure digital (SD) card as an optional device, and information to be stored in the communication apparatus 151 may be stored in the memory.

The connection mode of the communication apparatus according to the present embodiment is set by a connection setting process. The communication apparatus communicates with the information processing apparatus in accordance with a connection form based on the set connection mode. The connection mode of the communication apparatus in the present embodiment is set to an infrastructure connection mode when the communication apparatus makes communication by infrastructure connection, and is set to a direct connection mode when the communication apparatus makes communication by direct connection.

In this case, the process-sharing of the information processing apparatus 101 and the communication apparatus 151 is described above as an example; however, it is not particularly limited to the sharing form, and may employ another form.

In the present embodiment, it is assumed that the information processing apparatus 101 stores a predetermined application in, for example, the ROM 104 or the external storage device 106. The predetermined application is, for example, an application program for transmitting a print job to print image data, document data, or the like, in the information processing apparatus 101, to the communication apparatus 151. The application having such a function is hereinafter referred to as print application. The print application may have another function in addition to the print function. For example, the print application may have a function to scan a document set in the communication apparatus 151 when the communication apparatus 151 has a scan function, a function to make another setting for the communication apparatus 151, and a function to confirm the condition of the communication apparatus 151. That is, the print application may have a function of transmitting a scan job or a setting job to the communication apparatus 151 in addition to the print job. The predetermined application is not limited to the print application, and may be an application program having a function other than the print function.

Figure 2:
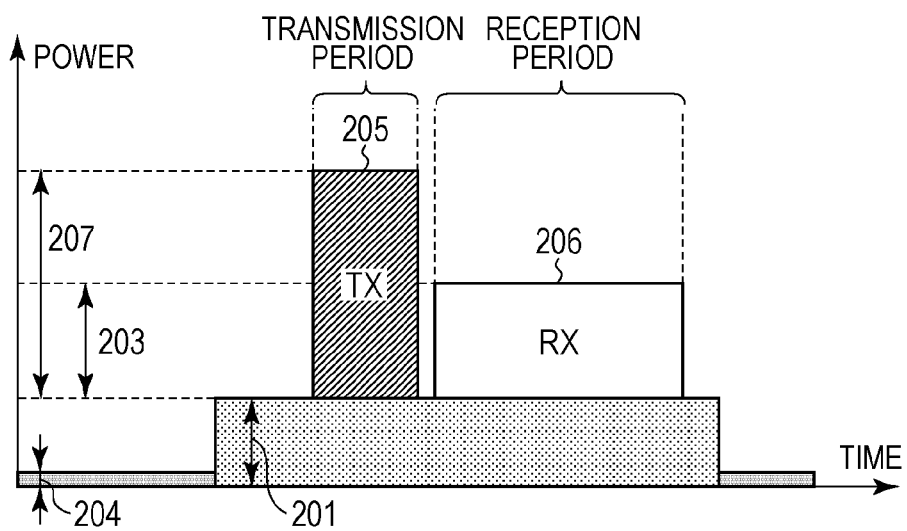
FIG. 2 is an illustration for describing a process of broadcast of advertisement information and reception of connection request information.

Moreover, in the present embodiment, the near field wireless communication unit 110 and the near field wireless communication unit 157 are described as making communication through BLE. In the present embodiment, the near field wireless communication unit 157 functions as an advertiser (or slave) that broadcasts advertisement information (described later), and the near field wireless communication unit 110 functions as a scanner (or master) that receives the advertisement information. The communication unit 109 and the communication unit 156 are described as making communication through wireless LAN (Wi-Fi). Now, transmission of advertisement information and a process of receiving a BLE connection request under the BLE standard are described. In the present embodiment, since the near field wireless communication unit 157 operates as the slave device as described above, the near field wireless communication unit 157 performs the above-described process. The near field wireless communication unit 157 makes communication by dividing a frequency band of 2.4 GHz into 40 channels (0 to 39 ch). The near field wireless communication unit 157 uses the 37th to 39th channels for transmitting advertisement information and for receiving a BLE connection request, and uses the 0th to 36th channels for data communication after BLE connection. In FIG. 2, the vertical axis indicates the power consumption of the near field wireless communication unit 157, and the horizontal axis indicates the time. FIG. 2 illustrates a power consumption when advertisement information is transmitted using one channel on a process basis. Tx205 indicates a total power consumption in a transmission process that is a process of broadcasting advertisement information. Rx206 indicates a total power consumption in a reception process that is a process of keeping a receiver for receiving a BLE connection request effective. A transmission power 207 indicates an instantaneous power consumption by the transmission process. A reception power 203 indicates an instantaneous power consumption by the reception process. A microcomputer operating power 201 indicates an instantaneous power consumption when a microcomputer in the near field wireless communication unit 157 operates. Note that the microcomputer operates before, after, and between Tx205 and Rx206 because the microcomputer needs to be previously actuated to execute or stop the transmission and reception processes. When advertisement information is transmitted through a plurality of channels, the power consumption increases in accordance with the number of channels through which the advertisement information is transmitted. In a period in which the microcomputer does not operate and the near field wireless communication unit 157 is in a power-saving state, a sleep power 204 is an instantaneous power consumption of the near field wireless communication unit 157. As described above, the near field wireless communication unit 157 performs the transmission process using a predetermined channel and then performs the reception process for a certain period using the same channel, thereby waiting for transmission of the BLE connection request from the information processing apparatus 101.

Figure 3:
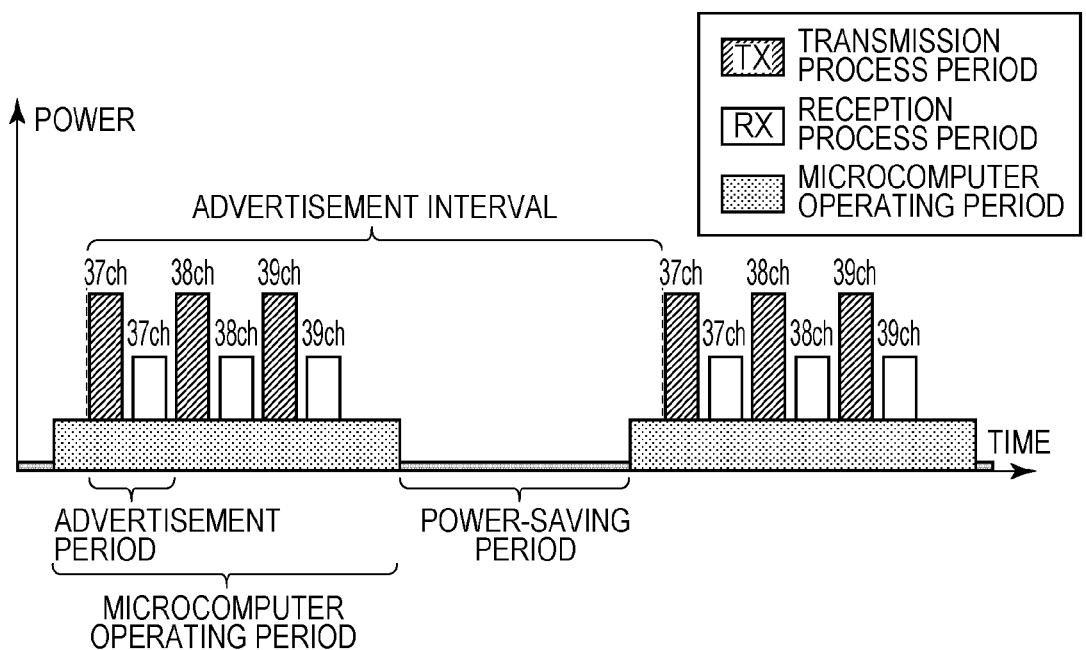
FIG. 3 is an illustration for describing advertisement through BLE.

As illustrated in FIG. 3, the near field wireless communication unit 157 repeats the transmission process and the reception process for advertisement information three times on a channel basis, then stops the operation of the microcomputer, and falls into a power-saving state for a certain period. Hereinafter, a combination of a transmission process and a reception process for advertisement information through a predetermined channel is referred to as advertisement. A time interval of transmission of advertisement information through a predetermined channel is referred to as advertisement interval. Note that the number of repeated times of advertisement since a first-time advertisement is made until the power-saving state is attained can be desirably changed as long as the number is three or less. In FIG. 3, for the channel during advertisement, the 37th channel, the 38th channel, and the 39th channel are used in that order; however, the order may be random.

Figure 9:
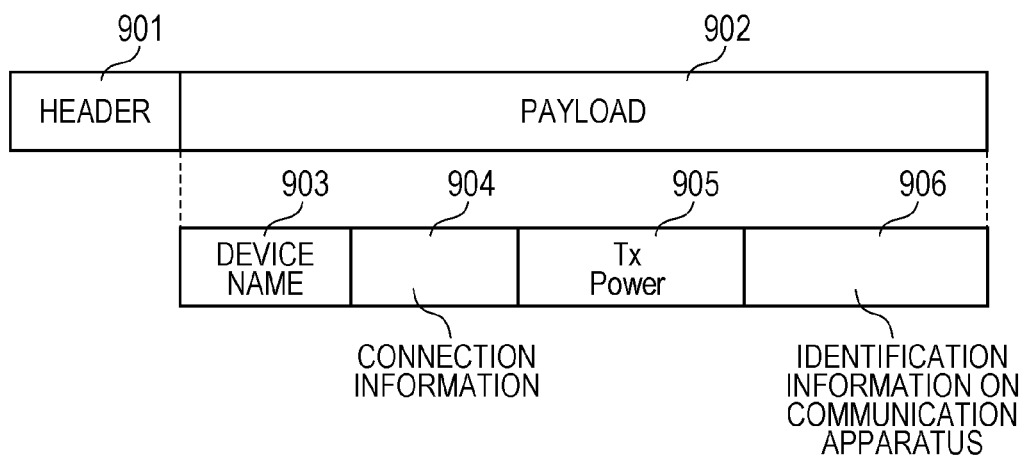
FIG. 9 is an illustration indicating a structure of advertisement information.

FIG. 9 illustrates an example structure of advertisement information to be broadcasted by the near field wireless communication unit 157 to the periphery of the communication apparatus 151.

When power supply is started, the near field wireless communication unit 157 performs an initialization process and falls into an advertising state. When being in the advertising state, the near field wireless communication unit 157 periodically broadcasts advertisement information to the periphery based on the advertisement interval. Advertisement information is a signal including basic header information (for example, identification information for identifying an apparatus to which the advertisement information is transmitted), and includes a header 901 and a payload 902. By receiving the advertisement information, the information processing apparatus 101 can recognize the presence of the communication apparatus 151. By transmitting a BLE connection request to the communication apparatus 151, the information processing apparatus 101 can be connected to the communication apparatus 151 through BLE connection. The header 901 is a region that stores information on the type of the advertisement information and the size of the payload 902. The payload 902 stores information, such as a device name 903 or installed profile information as identification information, connection information 904 for BLE connection with the communication apparatus 151, and transmission power (Tx Power) 905 for the advertisement information. The advertisement information may include identification information 906 of the communication apparatus. The identification information 906 of the communication apparatus corresponds to a media access control (MAC) address of the communication apparatus, service information of the communication apparatus, a service set identifier (SSID) of an access point in the communication apparatus, and a password.

In the present embodiment, when the power of the communication apparatus 151 is turned ON, the near field wireless communication unit 157 becomes the advertising state and starts transmitting advertisement information. However, the timing at which the near field wireless communication unit 157 starts transmitting advertisement information is not limited to the above-described embodiment, and may be, for example, a timing at which a predetermined operation is performed to enable the BLE function.

For example, when the near field wireless communication unit 157 transmits first advertisement information and receives a scan response to the first advertisement information from the information processing apparatus 101, the near field wireless communication unit 157 may transmit second advertisement information whose content differs from that of the first advertisement information. For example, it is assumed that the first advertisement information includes information relating to the transmission power of advertisement information and identification information of the near field wireless communication unit 157. It is assumed that the second advertisement information includes identification information of the communication apparatus 151, and information relating to a function and hardware of the communication apparatus 151. According to such an embodiment, for example, the print application is designed to handle the second advertisement information. Thus, it is assumed that the advertisement information handled by the print application is the second advertisement information in the following description.

Figure 6:
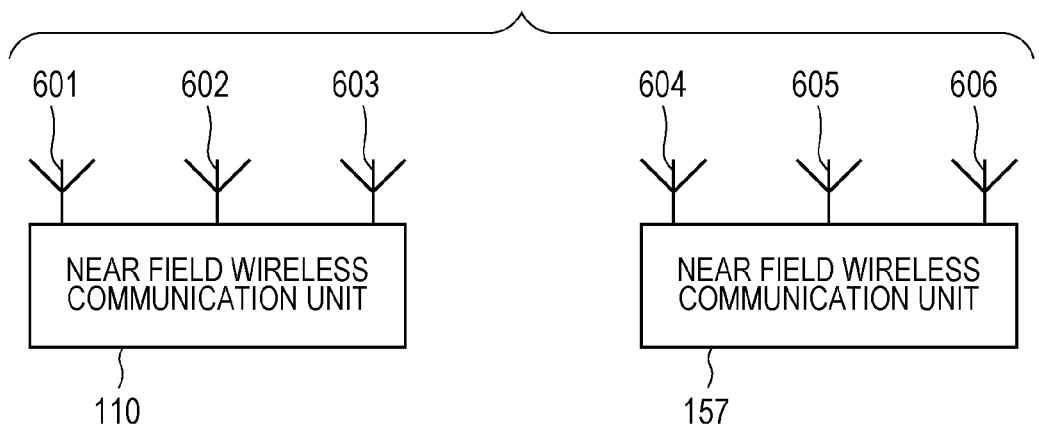
FIG. 6 is an illustration for describing direction detection through BLE.

FIG. 6 is a block diagram for describing a function of the information processing apparatus 101 to detect the direction of the communication apparatus 151 by using advertisement information that is transmitted by the near field wireless communication unit 157 in the communication apparatus 151. The near field wireless communication unit 110 in the information processing apparatus 101 includes an antenna 601, an antenna 602, and an antenna 603. The near field wireless communication unit 157 in the communication apparatus 151 includes an antenna 604, an antenna 605, and an antenna 606. The number of antennas included in each of the near field wireless communication unit 110 and the near field wireless communication unit 157 is not limited thereto. The number of antennas may be 1, 2, or 4 or more. The respective numbers of antennas included in the near field wireless communication unit 110 and the near field wireless communication unit 157 may differ from each other. In FIG. 6, the antennas included in the near field wireless communication unit 110 and the near field wireless communication unit 157 are arranged in lines; however, the arrangement is not limited thereto.

Figure 5:
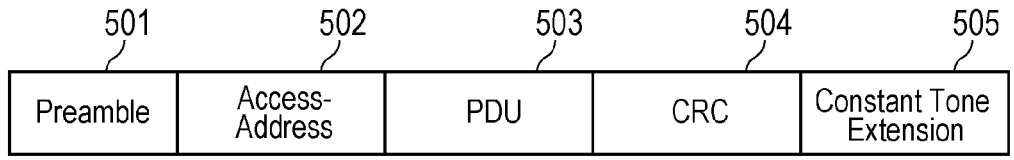
FIG. 5 is an illustration indicating a structure of advertisement information to be used for direction detection through BLE.

FIG. 5 illustrates an example structure of advertisement information that is transmitted by the near field wireless communication unit 157 in the communication apparatus 151 to cause the information processing apparatus 101 to detect the distance from the communication apparatus 151 and the direction of the position of the communication apparatus 151. Constant tone extension (CTE) 505 is data to be used to detect the direction of the communication apparatus 151 with respect to the information processing apparatus 101. Preamble 501 is data for clock synchronization when the information processing apparatus 101 receives advertisement information of the communication apparatus 151. Access-Address 502 is data for frame synchronization when the information processing apparatus 101 receives advertisement information of the communication apparatus 151. PDU 503 is a live data part in advertisement information that is transmitted by the communication apparatus 151. The header 901 and the payload 902 which are advertisement information illustrated in FIG. 9 are information included in the PDU 503. CRC 504 is an error detection code value during communication of the PDU 503.

There are two methods of the information processing apparatus 101 detecting the direction of the communication apparatus 151 including a method implemented by the near field wireless communication unit 110 including a plurality of antennas and a method implemented by the near field wireless communication unit 157 including a plurality of antennas.

Figure 7:
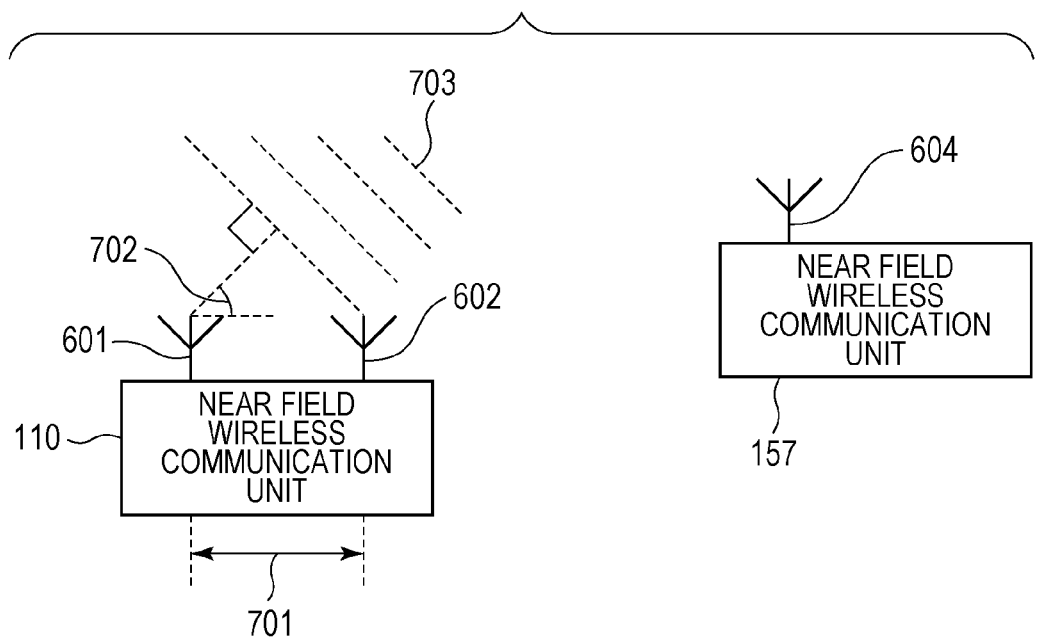
FIG. 7 is an illustration for describing direction detection through BLE.

Referring to FIG. 7, the method of the information processing apparatus 101 detecting the direction of the communication apparatus 151, the method which is implemented by the near field wireless communication unit 110 including a plurality of antennas, is described. The near field wireless communication unit 157 transmits an AoA Radio Signal 703 which is advertisement information including the CTE 505 from the antenna 604. The near field wireless communication unit 110 receives the AoA Radio Signal 703 with a plurality of antennas (both the antenna 601 and the antenna 602). In this case, it is assumed that ψ is a phase difference between the AoA Radio Signal 703 received by the antenna 601 and the AoA Radio Signal 703 received by the antenna 602 and λ is a wavelength. By using an AoA inter-antenna distance d 701, which is the distance between the antenna 601 and the antenna 602, and Expression (1), Angle of Arrival θ 702 which is the direction of the communication apparatus 151 from the information processing apparatus 101 is calculated.

$$\theta = \arccos((\psi\lambda)/(2\pi d)) \qquad \text{Expression (1)}$$

By calculating the Angle of Arrival θ 702, the information processing apparatus 101 which has received the advertisement information from the communication apparatus 151 can detect the direction of the communication apparatus 151.

Figure 8:
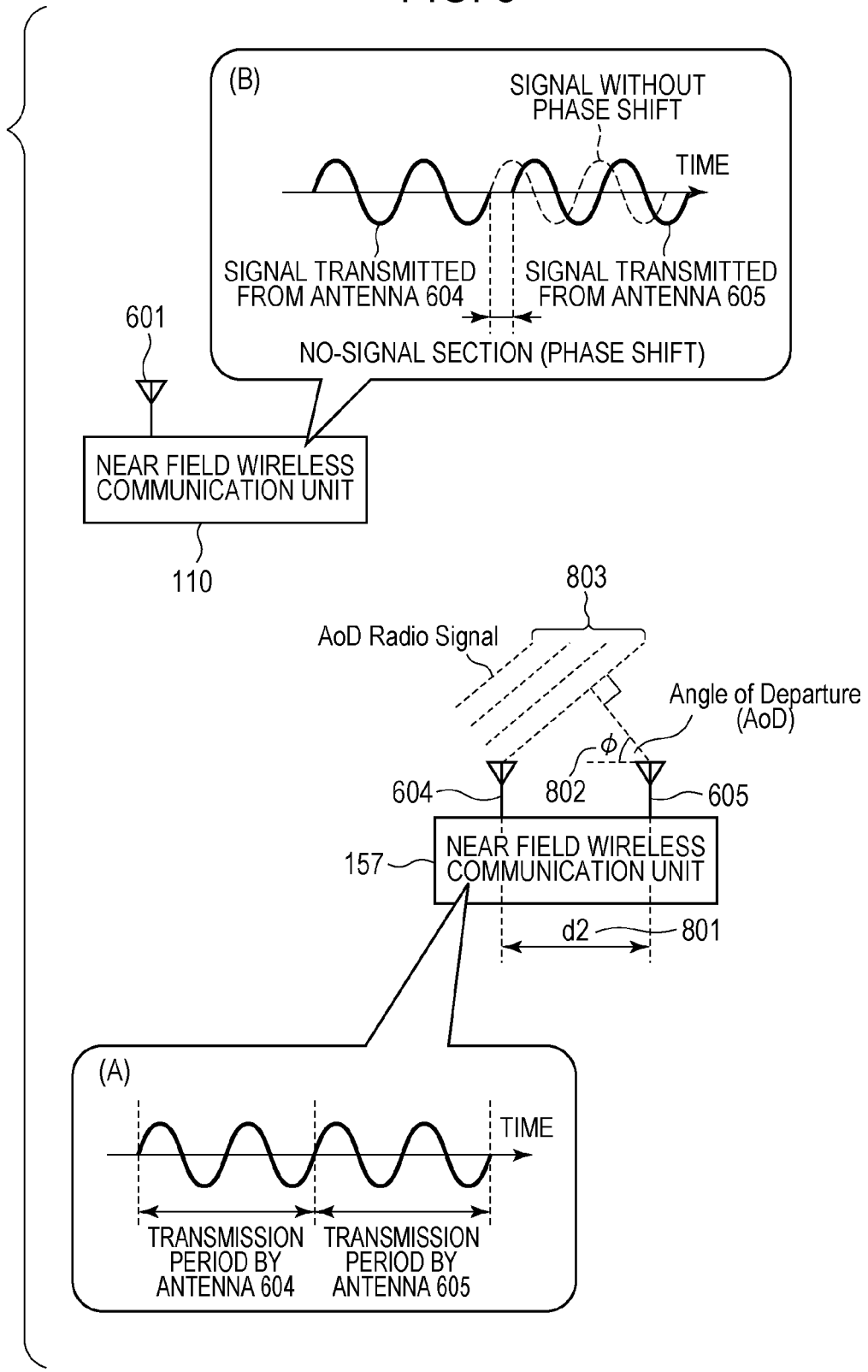
FIG. 8 is an illustration for describing direction detection through BLE.

Referring to FIG. 8, the method of the information processing apparatus 101 detecting the direction of the communication apparatus 151, the method which is implemented by the near field wireless communication unit 157 including a plurality of antennas, is described. The near field wireless communication unit 157 transmits an AoD Radio Signal 803 which is advertisement information including the CTE 505 from a plurality of antennas (both the antenna 604 and the antenna 605). The near field wireless communication unit 110 receives the AoD Radio Signal 803 with the antenna 601. ψ is a phase difference between the AoD Radio Signal 803 transmitted from the antenna 604 and the AoD Radio Signal 803 transmitted from the antenna 605 and λ is a wavelength.

For example, as illustrated in part (A) of FIG. 8, it is assumed that the transmission period for the AoD Radio Signal 803 by the antenna 604 is set, and the transmission period for the AoD Radio Signal 803 by the antenna 605 is set immediately after the former period. In this case, in the near field wireless communication unit 157, a no-signal section is not generated between the transmission of the AoD Radio Signal 803 by the antenna 604 and the transmission of the AoD Radio Signal 803 by the antenna 605. In contrast, the near field wireless communication unit 110 may receive the wireless signals according to a format illustrated in part (B) of FIG. 8. That is, the signal transmitted from the antenna 605 propagates through a path longer than the path of the signal transmitted from the antenna 604, and then arrives at the near field wireless communication unit 110 with a delay. Thus, a no-signal section is generated between the signals. When the antenna 605 transmits a signal first, the signal transmitted from the antenna 604 arrives at the near field wireless communication unit 110 before all signals transmitted from the antenna 605 arrive at the near field wireless communication unit 110. When a no-signal section with a predetermined length is set after completion of a signal transmission period of the antenna 604 and a signal transmission period from the antenna 605 is set, the no-signal section is observed to be longer than the predetermined length for the wireless signal to be received by the near field wireless communication unit 110. Likewise, when a no-signal section with a predetermined length is set after completion of a signal transmission period of the antenna 605 and a signal transmission period from the antenna 604 is set, the no-signal section is observed to be shorter than the predetermined length for the wireless signal to be received by the near field wireless communication unit 110. In this way, the signals transmitted from the plurality of antennas are observed to have a shift of timings corresponding to the path lengths by the near field wireless communication unit 110. To observe a shift of timings, the near field wireless communication unit 110 is previously notified about information on scheduling indicating from which antenna and at which timing a signal is transmitted (for example, from the near field wireless communication unit 157 or another apparatus).

A shift of reception timings corresponds to a shift in phase of reception signals. For example, in the example in FIG. 8, the signal transmitted from the antenna 605 propagates through a path longer than the path of the signal transmitted from the antenna 604 by d2×cos(φ), and then arrives at the near field wireless communication unit 110. In this case, d2 is an AoD inter-antenna distance 801 between the antenna 604 and the antenna 605. Due to the difference in path length, when c is a light propagation speed, a reception timing shift of d2×cos(φ)/c seconds is generated, and simultaneously, a phase difference by the following amount is generated.

$$\Psi 2 = 2\pi \times d2 \times \cos(\phi)/\lambda \qquad \text{Expression (2)}$$

Note that λ is a wavelength of a radio wave (advertisement information) as described above. φ is an angle defined by a straight line connecting the near field wireless communication unit 157 and the near field wireless communication unit 110, and a straight line connecting the antenna 604 and the antenna 605. The defined angle is referred to as Angle of Departure, and is hereinafter written as AoD 802. The near field wireless communication unit 110 can specify a phase difference Ψ2 by detecting correlation with reference to the first received signal among a plurality of signals transmitted from the near field wireless communication unit 157. The near field wireless communication unit 110 can calculate the AoD 802 as follows from Expression (3) using the phase difference Ψ2.

$$\phi = \arccos((\Psi 2 \times \lambda)/(2\pi \times d2)) \qquad \text{Expression (3)}$$

Note that the near field wireless communication unit 110 previously acquires information on the inter-antenna distance d2 from the near field wireless communication unit 157 or another device. By calculating the AoD 802 using Expression (3), the near field wireless communication unit 110 can specify the direction of the near field wireless communication unit 110 in view from the near field wireless communication unit 157. By recognizing the arrangement of the antenna 604 and the antenna 605, the near field wireless communication unit 110 can detect the direction in which a radio wave has arrived based on the AoD 802. That is, when the antenna 604 is arranged on the west side of the antenna 605 and the AoD 802 is detected as 45 degrees, the near field wireless communication unit 110 can detect that a radio wave has arrived in the southeast direction. Furthermore, the near field wireless communication unit 110 can detect not only the direction of the position of the near field wireless communication unit 157 with respect to the near field wireless communication unit 110, but also the distance between the near field wireless communication unit 110 and the near field wireless communication unit 157 through BLE. When detecting the distance, the near field wireless communication unit 110 specifies the strength (reception strength) of the advertisement information received by the near field wireless communication unit 110 and the transmission power used when the radio wave is transmitted from the near field wireless communication unit 157. The information relating to the transmission power is included in the advertisement information received by the near field wireless communication unit 110. The near field wireless communication unit 110 detects the distance between the near field wireless communication unit 110 and the near field wireless communication unit 157 based on the difference between the specified reception strength and transmission power. By acquiring information on the position at which the near field wireless communication unit 157 is arranged, the near field wireless communication unit 110 can detect the position of the information processing apparatus 101 with high accuracy.

In the description of the method that is implemented by the near field wireless communication unit 110 including the plurality of antennas, the embodiment has been described in which the two antennas of the antenna 601 and the antenna 602 are used as the plurality of antennas. However, the number of antennas to be used is not limited thereto. For example, the information processing apparatus 101 may use three or more antennas, and the average of Angles of Arrival θ obtained from the respective antennas may be calculated to acquire the Angle of Arrival θ 702. Likewise, in the method that is implemented by the near field wireless communication unit 157 including the plurality of antennas, the number of antennas to be used, which are used as the plurality of antennas, is not limited the aforementioned number. For example, the communication apparatus 151 may use three or more antennas, and the average of Angles of Departure θ obtained from the respective antennas may be calculated to acquire the Angle of Departure θ 802.

In the above description, the embodiment has been described in which one of the information processing apparatus 101 and the communication apparatus 151 uses the plurality of antennas; however, it is not limited thereto. Both the apparatuses may each use a plurality of antennas.

In the above description, the embodiment has been described in which the information processing apparatus 101 detects the direction of one communication apparatus 151; however, it is not limited thereto. The information processing apparatus 101 may detect the directions of two or more communication apparatuses 151. When the information processing apparatus 101 detects the directions of two or more communication apparatuses 151 and refer to respective detection data, the information processing apparatus 101 can detect the distance between the apparatuses, and the directions and positions of the apparatuses with high accuracy as compared with the embodiment of detecting the direction of one communication apparatus 151.

Now, an overview of generic attribute profile (GATT) communication under the BLE standard is described. GATT is a profile that deals with reading and writing (transmission and reception) of information under the BLE standard.

In GATT communication, two roles are defined including a GATT client and a GATT server based on a transfer source and a transfer target of data.

The GATT client transmits a request to the GATT server and receives a response from the GATT server. In the present embodiment, the information processing apparatus 101 serves as a GATT client. The GATT client reads information held in a storage region in a near field wireless communication unit of the GATT server, and writes information into the storage region.

When receiving a request from the GATT client, the GATT server makes a response to the GATT client. In the present embodiment, the communication apparatus 151 serves as a GATT server and the information processing apparatus 101 serves as a GATT client. The GATT server operates as a device that stores information such as state information on the GATT server.

Figure 11:
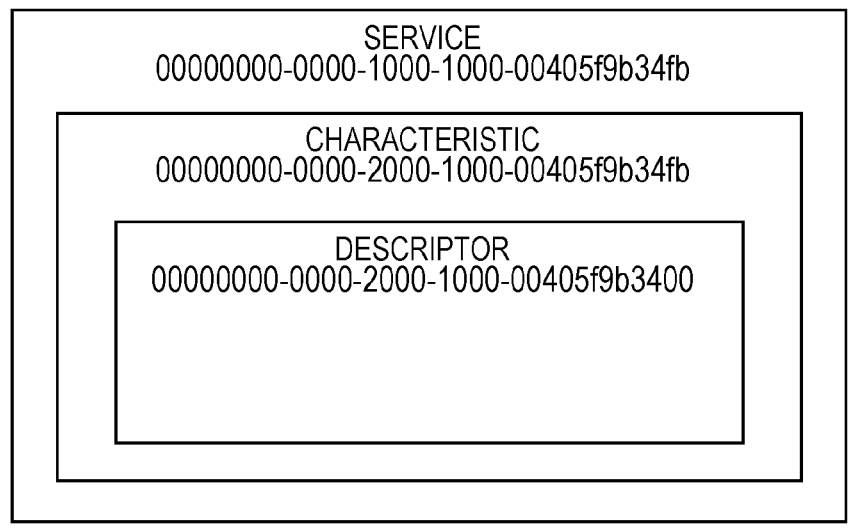
FIG. 11 is an illustration indicating a data format of GATT.

Next, a GATT data format is described. GATT data has a hierarchy structure as illustrated in FIG. 11, and includes three elements called service, characteristic, and descriptor. Note that the descriptor may be omitted. In the present embodiment, it is assumed that the GATT data constituted by the near field wireless communication unit 157 does not have a descriptor. The service, characteristic, and descriptor can be identified using a universally unique identifier (UUID) expressed by 32 digits. In this case, UUID is used as an identifier for uniquely identifying an object on software. The UUID is a numerical value of 128 bits, and is typically expressed like 550e8400-e29b-41d4-a716-446655440000 by hexadecimal number. Note that there may be a service, a characteristic, and a descriptor that are defined under the standard of Bluetooth SIG or that are specific to a vendor. The UUID specific to the vendor is expressed by 32 digits as described above; however, the UUID defined under the standard of Bluetooth SIG is expressed by 4 digits. That is, for example, the UUID defined under the standard of Bluetooth SIG is expressed as 2A49.

A service is a group of attributes in GATT data on a common section basis. Each service includes at least one characteristic. A characteristic has set therein one value per characteristic. A descriptor has set therein an attribute value that is used when additional information is required for a characteristic. The service, characteristic, and descriptor can each have set therein an attribute of read/write, which is a set value indicating whether read or write is permitted for a GATT client.

By designating the UUID of each of the service and characteristic, the GATT client can execute read/write on the value set in the designated characteristic. However, whether read/write is executable is based on a read/write attribute set in each of the service and characteristic.

FIG. 12 illustrates an example of GATT data constructed by the near field wireless communication unit 157. In the GATT data in FIG. 12, "Service UUID" indicates the UUID that is assigned to each service. "Service name" indicates the name of each service. "Characteristic UUID" indicates the UUID assigned to each characteristic. "Characteristic name" indicates the name of each characteristic. "Service readable" indicates whether the information processing apparatus 101 can read the value relating to each service. "Service writable" indicates whether the information processing apparatus 101 can write the value relating to each service. "Characteristic readable" indicates whether the information processing apparatus 101 can read the value relating to each characteristic. "Characteristic writable" indicates whether the information processing apparatus 101 can write the value relating to each characteristic. "Characteristic indicatable" indicates whether an indication (notification) can be made to the information processing apparatus 101 when the communication apparatus 151 updates the value relating to each characteristic. "Pairing required" indicates whether write or read is not permitted for the information processing apparatus 101 unless pairing has been made for a value relating to each characteristic. When "Service readable" indicates "readable (○)" and "Characteristic readable" indicates "readable (○)", the information processing apparatus 101 can read the value relating to the corresponding characteristic. When "Service readable" indicates "readable (○)" and "Characteristic readable" indicates non-readable (blank), the information processing apparatus 101 cannot read the value relating to the corresponding characteristic. "Value" indicates a value set for each characteristic. When "Pairing required" indicates pairing non-required (blank), the information processing apparatus 101 can read and write a value relating to the corresponding characteristic even when pairing is not made with the communication apparatus 151. In contrast, when "Pairing required" indicates pairing required (○), the information processing apparatus 101 cannot read and write a value relating to the corresponding characteristic unless pairing is made with the communication apparatus 151.

In the present embodiment, authentication is performed between the information processing apparatus 101 and the communication apparatus 151, and a pairing process is performed for executing read and write of data between the apparatuses through GATT communication. When pairing is not executed between the information processing apparatus 101 and the communication apparatus 151, the communication apparatus 151 does not permit read and write of information through GATT communication. In this way, a phenomenon can be prevented from occurring, in which the information processing apparatus 101 and the communication apparatus 151 of which pairing has not been performed make communication, and for example, information held by the communication apparatus 151 is unintentionally acquired by the information processing apparatus 101 without pairing. In the present embodiment, there are GATT communication permitted under a state without pairing, and GATT communication not permitted under a state without pairing. By allowing communication using information with low confidentiality through GATT communication that is permitted in a state without pairing, convenience of communication can be increased. In contrast, by allowing communication using information with high confidentiality through GATT communication that is not permitted in a state without pairing, security of communication can be improved.

A pairing process is described in detail. First, in the information processing apparatus 101, when the print application is actuated and an execution instruction for the pairing process is received from a user via the print application, search is started for advertisement information having specific apparatus information. Note that the specific apparatus information is, for example, the UUID or MAC address of an apparatus (printer or the like) corresponding to the print application. When receiving advertisement information having specific apparatus information, the information processing apparatus 101 causes a display unit to display a list of apparatuses that are transmission sources of the advertisement information having the specific apparatus information, and receives selection of an apparatus subjected to pairing from the user. In this case, description is given on a presupposition that the communication apparatus 151 is selected.

Figure 4A:
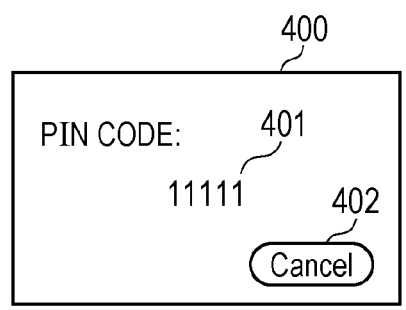
FIG. 4A illustrates a screen relating to a pairing process at a time of receiving a pairing request.
Figure 4B:
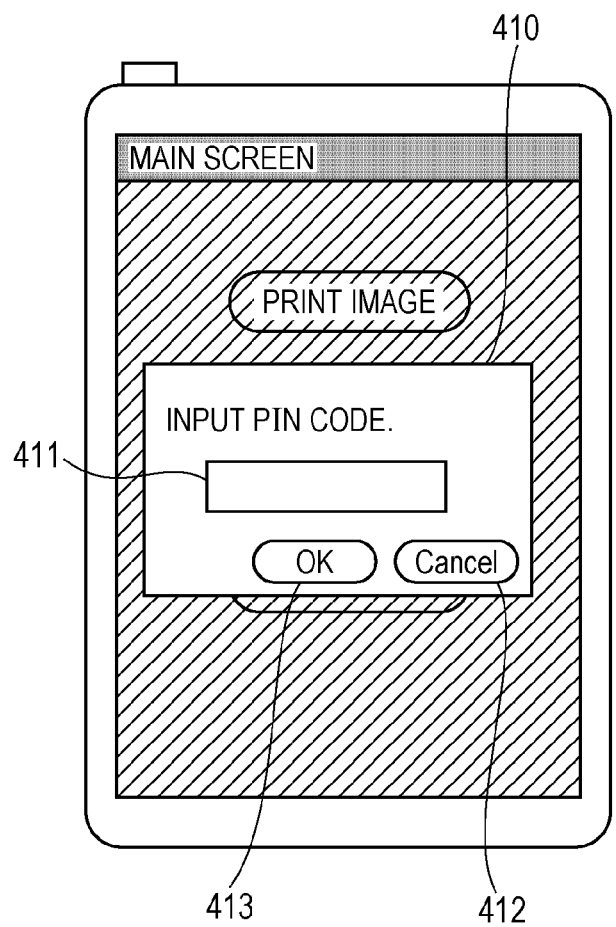
FIG. 4B illustrates a screen relating to a pairing process at a time of receiving an input from a user.

When receiving the selection of the apparatus subjected to pairing, the information processing apparatus 101 transmits a pairing request to the communication apparatus 151 by communication using a security manager protocol. It is assumed that communication between apparatuses is performed using the security manager protocol until pairing is ended. When receiving the pairing request, the communication apparatus 151 causes a display unit to display a PIN code display screen 400 as illustrated in FIG. 4A. On the PIN code display screen 400, a personal identification number (PIN) code 401 and a Cancel button 402 for canceling the pairing process are displayed. When transmitting the pairing request, the information processing apparatus 101 causes the display unit 108 to display a PIN code input screen 410 as illustrated in FIG. 4B. On the PIN code input screen 410, a PIN code input region 411 for receiving an input of the PIN code 401 from the user, an OK button 413 for transmitting the input PIN code 401 to the communication apparatus 151, and a Cancel button 412 for canceling the pairing process are displayed. When the OK button 413 is pressed in a state in which the PIN code 401 is input in the PIN code input region 411, the information processing apparatus 101 transmits information including the input PIN code 401 to the communication apparatus 151. The communication apparatus 151 determines whether the PIN code 401 included in the received information matches the PIN code 401 displayed on the PIN code display screen 400, and if determining matching, permits the information processing apparatus 101 for pairing. Specifically, the communication apparatus 151 exchanges a link key (authentication information) created by a predetermined method based on the PIN code 401 with a link key of the information processing apparatus 101 using a security manager protocol (SMP) under the BLE standard. The respective exchanged link keys are stored in a storage region (the ROM 104 or the like) of the information processing apparatus 101 and in a storage region (the ROM 152 or the like) of the communication apparatus 151. Thus, pairing is completed, and execution of BLE communication is permitted between the apparatuses. When pairing is completed, the information processing apparatus 101 hides the PIN code display screen 400 and displays the original screen again.

After pairing is completed, when transmitting a GATT communication request to the communication apparatus 151, the information processing apparatus 101 notifies the communication apparatus 151 about the link key stored in the storage region during the pairing process. When receiving the GATT communication request, the communication apparatus 151 compares the link key stored in the storage region during the pairing process with the link key obtained through the notification, and confirms whether the apparatus which has transmitted the GATT communication request is the apparatus with the pairing completed. When confirming that the apparatus is one with the pairing completed, the communication apparatus 151 starts reading or writing of information through GATT communication from or in the information processing apparatus 101. Thus, the information processing apparatus 101 can execute GATT communication with the communication apparatus 151 without an input of the PIN code by the user thereafter as far as the information processing apparatus 101 has completed the pairing process with the communication apparatus 151 once. In the above description, the embodiment has been described in which the user inputs the PIN code 401 displayed on the PIN code input screen 410, in the PIN code input region 411; however, it is not limited thereto. For example, an embodiment may be employed in which the PIN code 401 is fixed information (which is not freely changed by the user) and is stored in the information processing apparatus 101 when the print application is installed, so that the communication apparatus 151 is notified about the PIN code 401 without an input by the user. The timing at which the pairing process is started is not limited to the above-described embodiment, and, for example, a timing at which a user instructs printing via the print application or a timing before BLE connection is made in the connection setting process may be used.

The PIN code input screen 410 that is displayed by the information processing apparatus 101 may not be displayed by the print application. For example, the information processing apparatus 101 may have an application for setting (hereinafter, referred to as setting application). The setting application is an application program for making setting relating to a function to be executed by an OS. For example, the setting application may be an application program that is installed together in a series of processes of installing an OS in the information processing apparatus 101, or that is installed previously in the information processing apparatus 101 together with an OS at arrival of the information processing apparatus 101. When pairing is made with the communication apparatus 151, the information processing apparatus 101 may actuate the setting application to make a transition of the print application to the background, and may receive an input for pairing on the Bluetooth setting screen that is displayed by the setting application from the user.

In the above description, the pairing method by inputting the PIN code has been described; however, the pairing method is not limited thereto. A pairing method other than one by inputting the PIN code is described below. The information processing apparatus 101 acquires information called key seed, which is information held by the communication apparatus 151, from the communication apparatus 151 through BLE connection. The information processing apparatus 101 and the communication apparatus 151 generate a link key from the key seed in accordance with a rule that is previously recognized by both the information processing apparatus 101 and the communication apparatus 151. The generated link key is stored in a storage region (the ROM 104 or the like) of the information processing apparatus 101 and in a storage region (the ROM 152 or the like) of the communication apparatus 151. That is, the information processing apparatus 101 and the communication terminal 151 each hold the same link key. The link key is generated and GATT communication using the link key is available. Thus, authentication is performed between the communication apparatus 151 and the information processing apparatus 101 and the pairing process is completed. After the pairing process is completed, in communication between the information processing apparatus 101 and the communication apparatus 151, communication is made using information encrypted based on the link key. When receiving information encrypted based on the link key, the information processing apparatus 101 and the communication apparatus 151 decrypt the information using the link key held by them, thereby recognizing the information before encryption.

FIG. 13 is a sequence diagram for describing BLE communication between the information processing apparatus 101 and the communication apparatus 151. A process of the communication apparatus 151 indicated by the process sequence is implemented by the CPU 154 loading a control program stored in the ROM 152 or an HDD (not illustrated) included in the communication apparatus 151 into the RAM 153 and executing the control program. A process of the information processing apparatus 101 indicated by the process sequence is implemented by the CPU 103 loading a control program stored in the ROM 104 or an HDD (not illustrated) included in the information processing apparatus 101 into the RAM 105 and executing the control program.

In the following description, it is assumed that the communication apparatus 151 is an advertiser that transmits advertisement information at a predetermined interval. In addition, it is assumed that the information processing apparatus 101 is a scanner that waits for advertisement information that is transmitted from an advertiser located in the periphery. First, the near field wireless communication unit 157 in the communication apparatus 151 transmits advertisement information (S1301 to S1303). By the near field wireless communication unit 110 receiving the advertisement information transmitted from the near field wireless communication unit 157, the information processing apparatus 101 can recognize the presence of the communication apparatus 151.

The information processing apparatus 101 recognizes the communication apparatus 151, and when determining to make connection to the communication apparatus 151, transmits connection request information to the communication apparatus 151. Specifically, the near field wireless communication unit 110 transmits CONNECT_REQ which is a request for transition to a connection event that establishes network connection through BLE (S1304). When the near field wireless communication unit 157 receives CONNECT_REQ, the information processing apparatus 101 and the communication apparatus 151 prepare transition to the connection event. Specifically, the near field wireless communication unit 110 and the near field wireless communication unit 157 respectively notify the CPU 103 and the CPU 154 about completion of the connection process for GATT communication.

Then, the information processing apparatus 101 and the communication apparatus 151 transition from the scanner and the advertiser to a master and a slave, and the information processing apparatus 101 serving as the master and the communication apparatus 151 serving as the slave establish connection (BLE connection) for GATT communication. Note that, under the BLE standard, a master can form a star topology of "one-to-many" with respect to slaves. Once the BLE connection is established, the information processing apparatus 101 and the communication apparatus 151 can thereafter make data communication through the GATT communication method.

The information processing apparatus 101 is required to acquire which type of configuration of GATT data the communication apparatus 151 has, before making an access to the GATT data of the communication apparatus 151 through GATT communication. The configuration of the GATT data is, for example, the number of services and the number of characteristics in the GATT data, the respective values of UUID, and attributes indicating whether read is available. A way of the information processing apparatus 101 acquiring the configuration of the GATT data is called discovery.

The information processing apparatus 101 starts the discovery in S1305 after the BLE connection is established in S1304. Specifically, the information processing apparatus 101 transmits a discovery request for requesting information indicating the configuration of the GATT data of the communication apparatus 151 to the communication apparatus 151. Thus, the communication apparatus 151 transmits information indicating the configuration of the GATT data to the information processing apparatus 101 in response to the discovery request. The information processing apparatus 101 which has received the information indicating the configuration of the GATT data specifies the region that stores a hash vale in the GATT data of the communication apparatus 151, and reads the hash value. Note that the hash value is a value that is stored in the Database Hash Characteristic with the Characteristic UUID of 0x2B2A in FIG. 12. The communication apparatus 151 stores a hash value that is previously calculated from the configuration of the GATT data by the communication apparatus 151, as a value of the Database Hash Characteristic. That is, the hash value is a value that is uniquely determined in accordance with the configuration of the GATT data of the communication apparatus 151.

Note that the information processing apparatus 101 stores a hash value read from a terminal to which the information processing apparatus 101 was connected through BLE in the past, into a memory (the ROM 104 or the like) included in the information processing apparatus 101. In S1306, the information processing apparatus 101 compares the hash value read in S1305 with the hash value read in the past (the hash value stored in the memory included in the information processing apparatus 101) to figure out whether there is a hush value in the past that matches the read hash vale. That is, the information processing apparatus 101 determines whether the communication apparatus 151 is a terminal to which the information processing apparatus 101 was connected through BLE in the past. At this time, the information processing apparatus 101 may add another information such as individual identification information like the MAC address of the communication apparatus 151 into determination conditions in addition to the hash value.

If NO is determined in S1306, the information processing apparatus 101 continues the discovery to recognize the residual configuration of the GATT data of the communication apparatus 151. Thus, in S1307, the information processing apparatus 101 transmits a discovery request for requesting information indicating the configuration of the GATT data of the communication apparatus 151 to the communication apparatus 151. The communication apparatus 151 which has received the request transmits information indicating the configuration of the GATT data to the information processing apparatus 101 in S1308. Note that the transmission and reception of the discovery request and the transmission and reception of the information indicating the configuration of the GATT data are repeated by the numbers of services, characteristics, and descriptors in the GATT data. Thus, in S1309, the transmission and reception of the discovery request and the transmission and reception of the information indicating the configuration of the GATT data are repeated until the transmission of all information indicating the configuration of the GATT data is completed.

When the transmission of all information indicating the configuration of the GATT data is completed, in S1310, the information processing apparatus 101 stores, as a cache, the configuration of the GATT data of the communication apparatus 151 in the memory included in the information processing apparatus 101. At this time, the information processing apparatus 101 stores the cache of the configuration of the GATT data of the communication apparatus 151 and the hash value obtained from the communication apparatus 151 in the memory in an associated manner. The information processing apparatus 101 may further store another information such as individual identification information like the MAC address of the communication apparatus 151 in the memory in an associated manner.

If YES is determined in S1306, the information processing apparatus 101 has already cached the configuration of the GATT data of the communication apparatus 151. Hence, the process from S1307 to S1310 may be omitted.

By acquiring the configuration of the GATT data of the communication apparatus 151, the information processing apparatus 101 can thereafter execute desirable GATT communication with the communication apparatus 151. Thus, the information processing apparatus 101 executes desirable GATT communication with the communication apparatus 151 in S1311.

After the GATT communication is completed, the information processing apparatus 101 transmits a release request in S1312. The communication apparatus 151 which has received the release request transmits a release response in S1313, and ends the BLE connection between the apparatuses. When the BLE connection between the apparatuses is ended, the information processing apparatus 101 and the communication apparatus 151 respectively return to the scanner and the advertiser, and the communication apparatus 151 resumes transmission of advertisement information.

Figure 10:
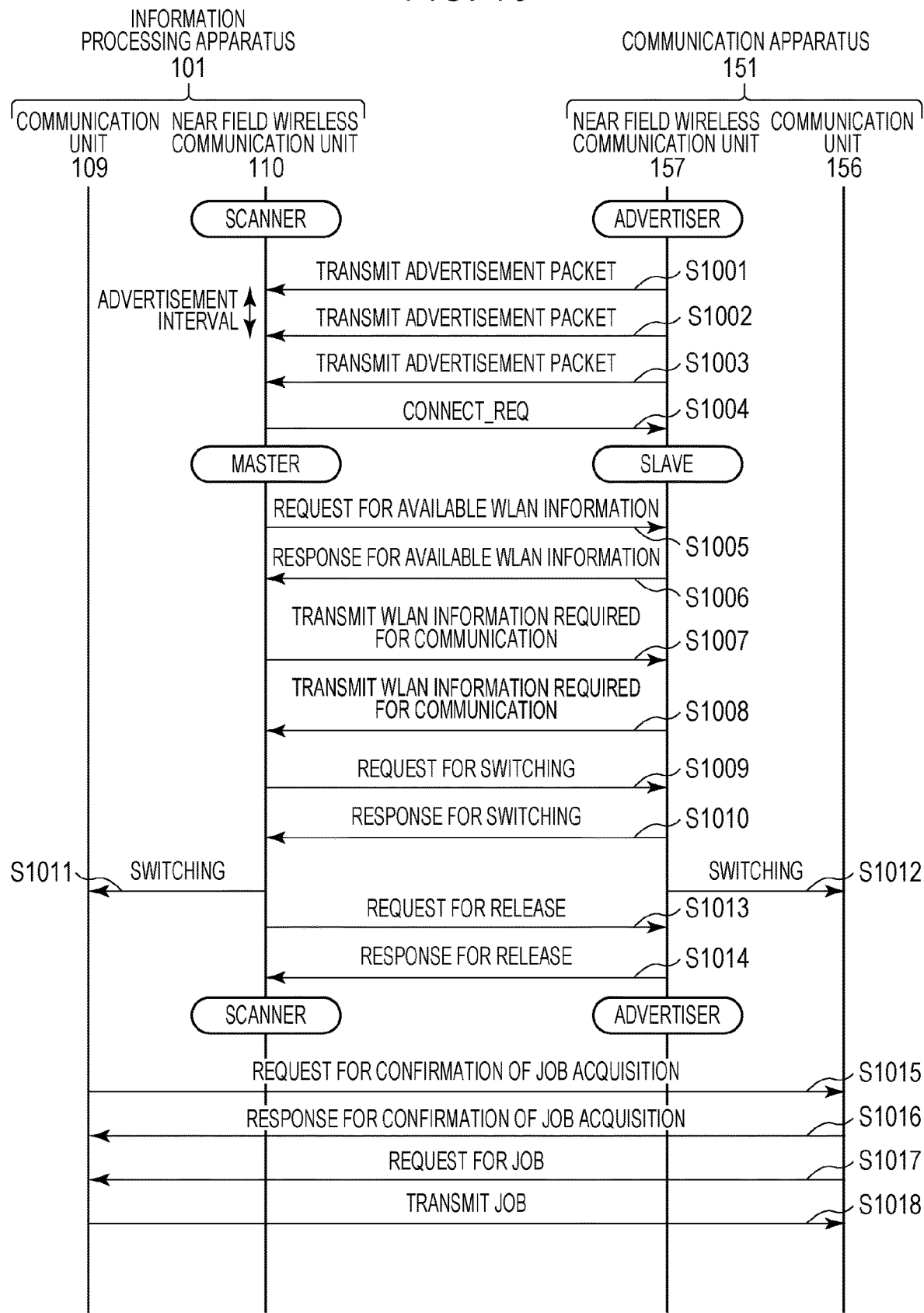
FIG. 10 is a sequence diagram indicating a process when the information processing apparatus and the communication apparatus make network connection through a BLE communication method.

FIG. 10 is a sequence diagram indicating a process when the information processing apparatus 101 and the communication apparatus 151 make network connection through the BLE communication method. Now, an example is described in which a job is transmitted and received by handover. Note that handover is a technology in which respective apparatuses that make communication exchange connection information for making communication of a high-speed communication method through a near field communication method, and then the scheme is switched to the high-speed communication method to perform transmission and reception of data. In the present embodiment, BLE is used for the near field communication method, and Wi-Fi is used for the high-speed communication method. The communication speed of GATT communication (bidirectional communication available by establishment of BLE connection between apparatuses) is lower than the communication speed of Wi-Fi communication. Thus, authentication between the apparatuses and exchange of connection information for Wi-Fi communication are performed through GATT communication, and large-volume data (in this case, job) is transferred by Wi-Fi communication at a high communication speed, thereby providing efficient data transfer. The communication method used by handover is not limited to the scheme in the above-described embodiment, and various communication methods may be used for the near field communication method and the high-speed communication method. For example, connection information for Wi-Fi communication may be exchanged by NFC communication or Wi-Fi Aware communication, and then exchange of data may be performed by Wi-Fi communication.

A process of the communication apparatus 151 indicated by the process sequence is implemented by the CPU 154 loading a control program stored in the ROM 152 or a HDD (not illustrated) included in the communication apparatus 151 into the RAM 153 and executing the control program. A process of the information processing apparatus 101 indicated by the process sequence is implemented by the CPU 103 loading a control program stored in the ROM 104 or an HDD (not illustrated) included in the information processing apparatus 101 into the RAM 105 and executing the control program.

In the following description, it is assumed that the communication apparatus 151 is an advertiser that transmits advertisement information at a predetermined interval. In addition, it is assumed that the information processing apparatus 101 is a scanner that waits for advertisement information that is transmitted from an advertiser located in the periphery. First, the near field wireless communication unit 157 transmits advertisement information (S1001 to S1003). By the near field wireless communication unit 110 receiving the advertisement information transmitted from the near field wireless communication unit 157, the information processing apparatus 101 can recognize the presence of the communication apparatus 151.

The information processing apparatus 101 recognizes the communication apparatus 151, and when determining to make connection to the communication apparatus 151, transmits connection request information to the communication apparatus 151. Specifically, the near field wireless communication unit 110 transmits CONNECT_REQ which is a request for transition to a connection event that establishes network connection through BLE (S1004). When the near field wireless communication unit 157 receives CONNECT_REQ, the information processing apparatus 101 and the communication apparatus 151 prepare transition to the connection event. Specifically, the near field wireless communication unit 110 and the near field wireless communication unit 157 respectively notify the CPU 103 and the CPU 154 about completion of the connection process for GATT communication. Then, the information processing apparatus 101 and the communication apparatus 151 transition from the scanner and the advertiser to a master and a slave, and the information processing apparatus 101 serving as the master and the communication apparatus 151 serving as the slave establish connection (BLE connection) for GATT communication. Note that, under the BLE standard, a master can form a star topology of "one-to-many" with respect to slaves. Once the BLE connection is established, the information processing apparatus 101 and the communication apparatus 151 can thereafter make data communication through the GATT communication method. Note that GATT communication is communication that is performed using a GATT profile after BLE connection is established, and is also communication that is performed via near field wireless communication units of respective apparatuses. When the communication apparatus 151 establishes BLE connection, the communication apparatus 151 may stop advertisement, or may switch the content of advertisement information to be transmitted. Specifically, the communication apparatus 151 may switch advertisement information from advertisement information (ADV_IND) with which the receiving apparatus can transmit a connection request into advertisement information (ADV_SCAN_IND or ADV_NONCONN_IND) with which the receiving apparatus cannot transmit a connection request.

Then, in S1005, the near field wireless communication unit 110 requests the near field wireless communication unit 157 for information on a communication protocol available for the communication apparatus 151.

The request includes the information on the communication protocol available for the information processing apparatus 101. By receiving the request, the near field wireless communication unit 157 can recognize that the information processing apparatus 101 can use a communication method such as Wi-Fi. In S1006, the near field wireless communication unit 157 gives information on a communication protocol available for the communication apparatus 151 in response to the request received in S1005. Accordingly, the apparatuses can recognize the available communication protocol other than BLE.

In this case, recognition of the available communication protocol other than BLE is assumed to be determination of switching communication between the apparatuses into Wi-Fi communication by the information processing apparatus 101. Note that, at this time, the communication apparatus 151 may determine whether the communication method is switched. If switching of the communication method is determined, in S1007 and S1008, the apparatuses each exchange communication information required for performing communication through Wi-Fi, such as information on an address to specify a communication target or information on SSID. Then, in S1009, the near field wireless communication unit 110 transmits a request for switching the communication method between the apparatuses from GATT communication into Wi-Fi communication (communication switch request). When receiving the switch request, the near field wireless communication unit 157 makes a response in S1010.

When the request for the switch and the response thereto have been correctly performed, in S1011, the information processing apparatus 101 switches the communication unit to be used for communication with the communication apparatus 151 from the near field wireless communication unit 110 to the communication unit 109. Furthermore, in S1012, the communication apparatus 151 switches the communication unit to be used for communication with the information processing apparatus 101 from the near field wireless communication unit 157 to the communication unit 156. After the switching, in S1013, the near field wireless communication unit 110 transmits a release request. The near field wireless communication unit 157 which has received the release request transmits a release response in S1014, and ends the BLE connection between the apparatuses. When the BLE connection between the apparatuses is ended, the information processing apparatus 101 and the communication apparatus 151 respectively return to the scanner and the advertiser, and the near field wireless communication unit 157 resumes transmission of advertisement information.

Thereafter, the respective apparatuses use the information required for making Wi-Fi communication exchanged in S1007 and S1008 to make Wi-Fi communication. First, in S1015, the communication unit 109 confirms the communication unit 156 whether the communication apparatus 151 can acquire a job. In this case, for example, information on a space for temporarily storing an image to be transferred to the communication apparatus 151 is confirmed. After receiving the request for confirmation, the communication unit 156 transmits a response to the confirmation in S1016.

If a correct response is obtained and it is determined that the communication apparatus 151 can acquire a job, in S1017, the communication unit 156 requests a job. The communication unit 109 which has received the request for a job transmits a job including image data or the like present in the information processing apparatus 101 to the communication unit 156 in S1018. Note that the job to be transmitted at this time is selected at a timing, for example, before BLE connection is established, after BLE connection is established, or after Wi-Fi connection is established. The job to be transmitted is not limited to a print job, and may be, for example, a scan job to instruct the communication apparatus 151 to perform scanning, or a job for the information processing apparatus 101 to acquire information on the state of the communication apparatus 151. Alternatively, the job to be transmitted may be, for example, a command for the communication apparatus 151 to execute any of various operations, such as change of setting of the communication apparatus 151. When the transmission of the job is completed, the information processing apparatus 101 disconnects Wi-Fi connection with the communication apparatus 151 and returns to the network state immediately before the handover. Specifically, for example, when the information processing apparatus 101 has been connected to a mobile communication network, such as 3G or long term evolution (LTE); or an access point such as a router before executing the handover, the information processing apparatus 101 establishes again connection to the mobile communication network or the access point. Thus, the information processing apparatus 101 holds information on the network state immediately before the handover and information required for establishing the network information, before the information processing apparatus 101 establishes the handover.

As described above, by using the handover technology, connection information for communication using a high-speed communication method is exchanged through a communication method with high usability (near field communication method), and then, data with a large volume can be exchanged at high speed through the high-speed communication method.

When the communication method is switched by the handover from the GATT communication to the Wi-Fi communication, the BLE connection between the apparatuses is disconnected. Thus, the near field wireless communication unit 157 resumes transmission of advertisement information.

As described above, in the present embodiment, the information processing apparatus 101 can execute communication with the communication apparatus 151. When a plurality of communication apparatuses 151 are present in the vicinity of the information processing apparatus 101, the user needs to execute an operation for causing the information processing apparatus 101 to specify a communication apparatus 151 with which the information processing apparatus 101 makes communication. Thus, in the present embodiment, an embodiment capable of easily executing an operation for causing the information processing apparatus 101 to specify a communication apparatus 151 with which the information processing apparatus 101 makes communication is described.

Figure 14:
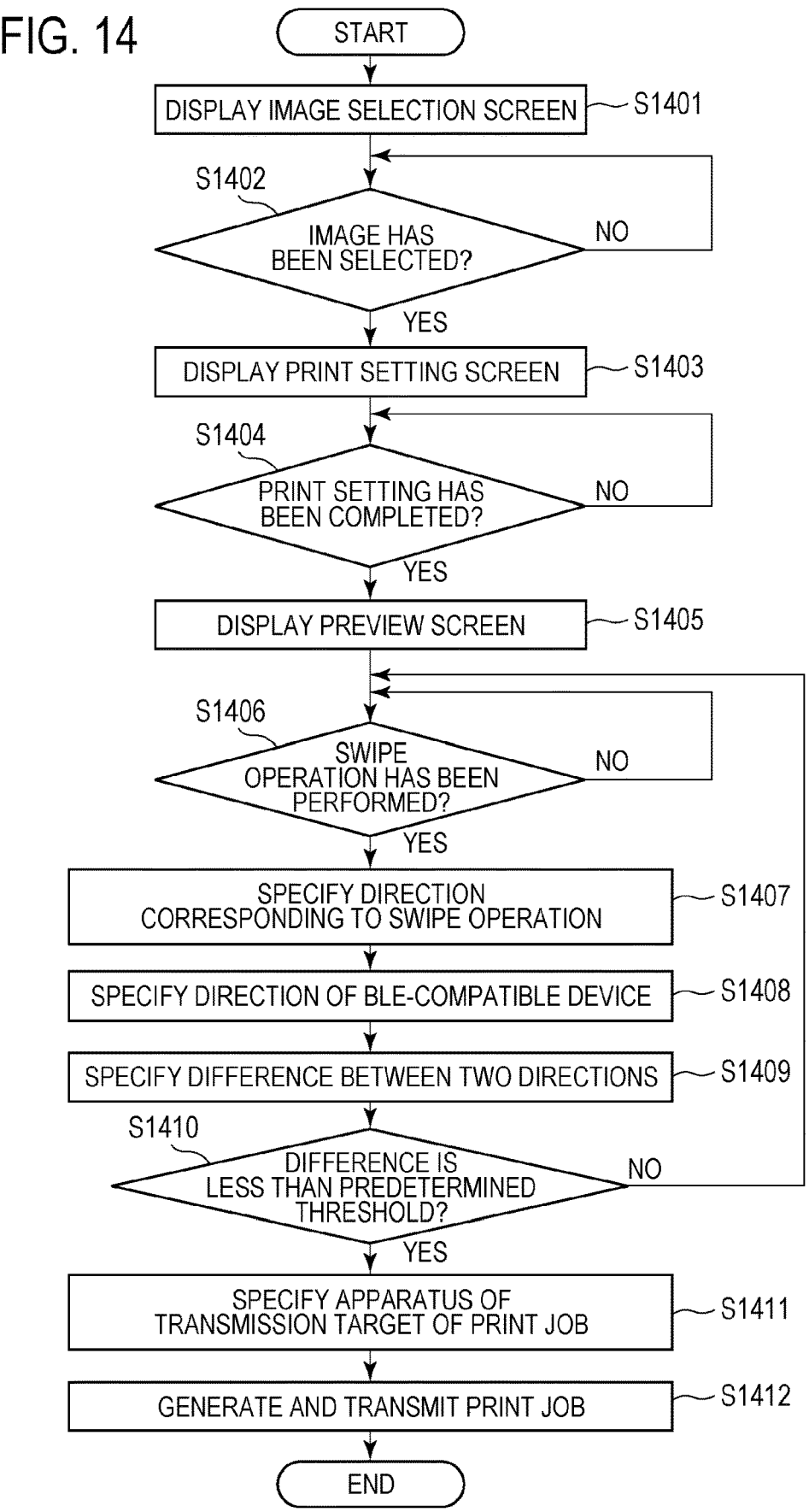
FIG. 14 is a flowchart indicating a transmission process of a print job that is executed by the information processing apparatus.

FIG. 14 is a flowchart indicating a transmission process of a print job that is executed by the information processing apparatus 101. The process is implemented by the CPU 103 loading a control program or the print application stored in the ROM 104 or an HDD (not illustrated) included in the information processing apparatus 101 into the RAM 105 and executing the control program. The process is started in a state in which the print application is actuated in the information processing apparatus 101.

In S1401, the CPU 103 causes the display unit 108 to display thumbnails of printable images (image selection screen) stored in the ROM 104 or the external storage device 106 in accordance with an operation with respect to the screen displayed by the print application.

Then, in S1402, the CPU 103 determines whether a user has selected an image to be printed from the thumbnails. If YES, the CPU 103 goes to S1403. If NO, the CPU 103 executes S1402 again, and waits for selection of an image.

In S1403, the CPU 103 causes a print setting screen to be displayed for print setting to print the selected image. By making an input with respect to the print setting screen, the user can make, for example, setting of the type and size of a recording medium to be printed, setting of print quality, setting of the number of copies, and setting of whether monochrome print or color print.

In S1404, the CPU 103 determines whether an input indicating completion of the print setting has been made. If YES, the CPU 103 goes to S1405. If NO, the CPU 103 executes S1404 again, and waits for an input of completion of the print setting.

Figure 16:
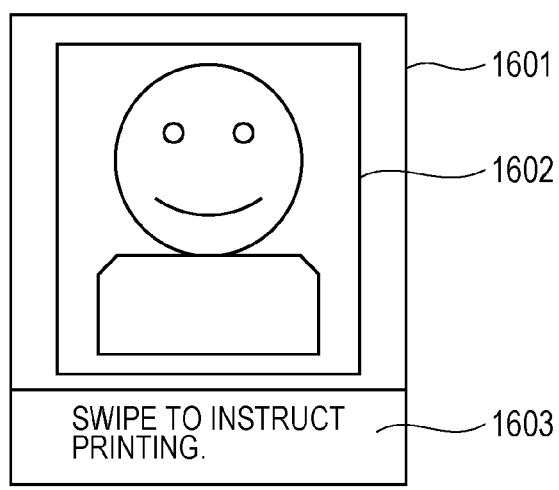
FIG. 16 illustrates an example of a preview screen.

In S1405, the CPU 103 reads the image to be printed from the ROM 104 or the external storage device 106, and causes the display unit 108 to display a preview screen indicating a print preview of the image to be printed. FIG. 16 illustrates an example of the preview screen that is displayed at this time. A preview screen 1601 includes a preview region 1602 indicating a print preview of an image to be printed, and an instruction region 1603 to urge the user to make a swipe operation. The preview screen may include, for example, the content of the input print setting.

Figure 18:
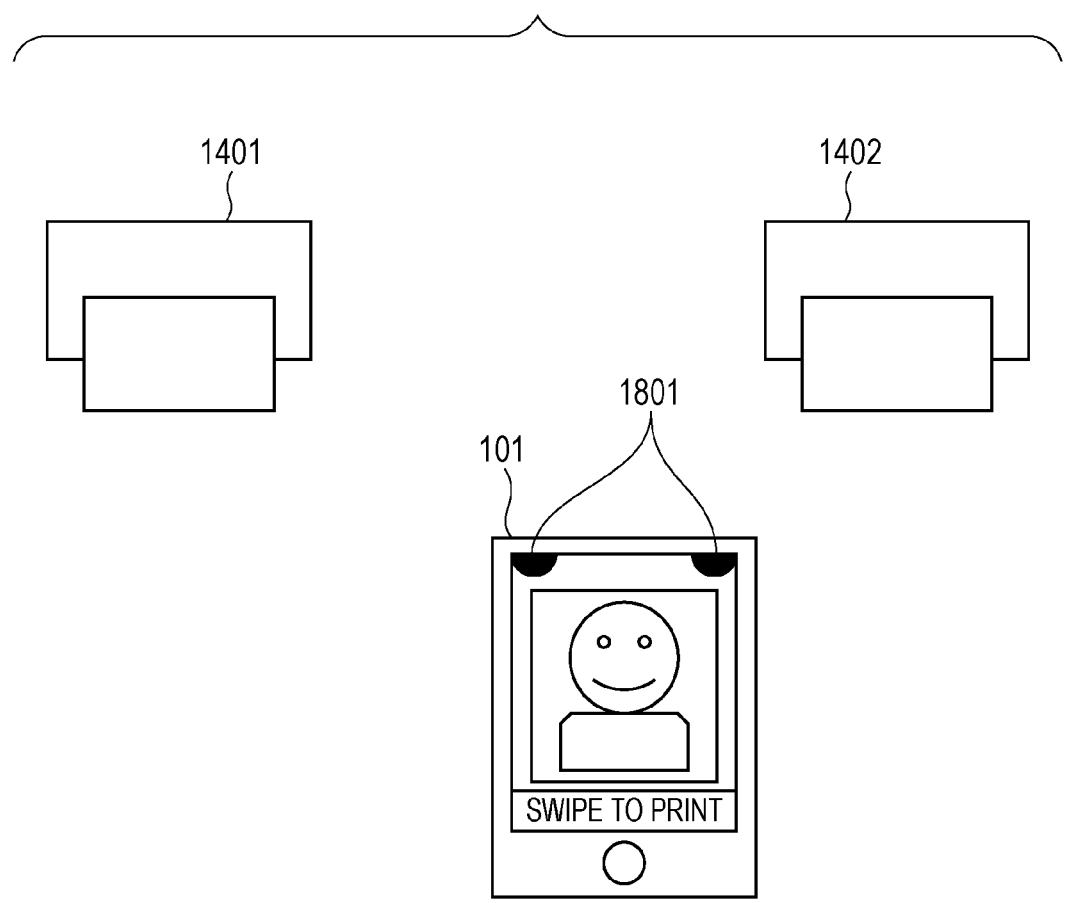
FIG. 18 illustrates an example of displaying a direction guide on the preview screen.

As illustrated in FIG. 18, the CPU 103 may cause a direction guide 2001 to be displayed on the preview screen. The direction guide 1801 provides the direction of each BLE-compatible device present in the vicinity of the information processing apparatus 101. With the display, the user easily recognizes the directions and number of BLE-compatible devices present in the vicinity of the information processing apparatus 101, and becomes able to more intuitively execute an operation for selecting a transmission target of a print job. In addition, the status and capability of a BLE-compatible device, the distance to the BLE-compatible device, and so forth, may be expressed using a color or a shape of the direction guide 1801. For example, when the status is normal, the status may be displayed in green, when the residual amount of paper or ink is small, the status may be displayed in yellow, when printing is not available, the status may be displayed in red, icons that are diagrams of respective functions may express capability, and devices may be indicated smaller as the distance is larger. Furthermore, a tap operation on the direction guide 1801 may be accepted, thereby displaying a screen on which the user can recognize the details of the BLE-compatible device. Note that various information provided to the user as described above is provided based on information included in the advertisement information.

In S1406, the CPU 103 determines whether the user has performed a swipe operation. Specifically, a swipe operation is an operation in which a user touches the display unit 108 with an operator (finger or touch device), then moves the operator in a certain direction without separating the operator from the display unit 108, and then releases the operator from the display unit 108. If YES, the CPU 103 goes to S1407. If NO, the CPU 103 executes S1406 again, and waits for a swipe operation. Note that the screen for receiving a swipe operation is not limited to the preview screen, and may be another screen.

Figure 15:
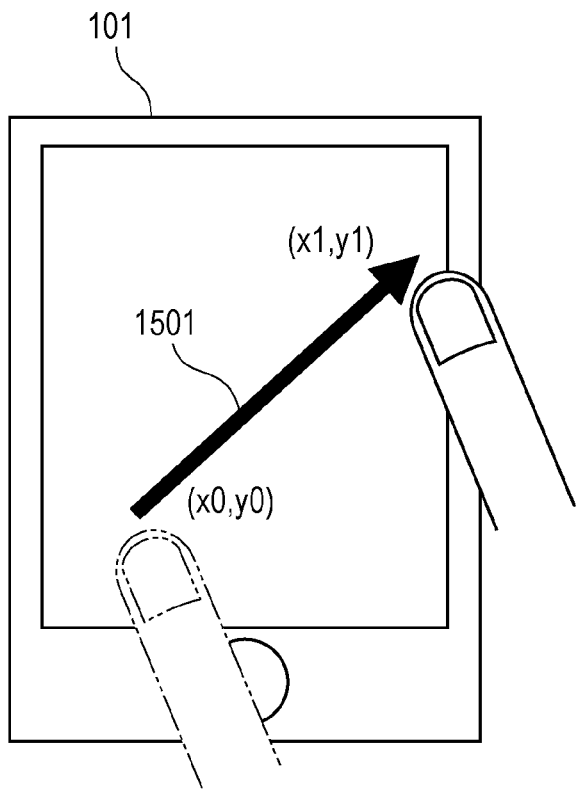
FIG. 15 is a flowchart indicating an example of a method of calculating a swipe direction.

In S1407, the CPU 103 analyzes the swipe operation performed by the user and specifies a direction corresponding to the swipe operation (hereinafter, swipe direction). Specifically, the direction of the position at which the operator is released from the display unit 108 with respect to the position at which the operator touches the display unit 108 during the swipe operation is specified as the swipe direction. FIG. 15 illustrates an example of a method of calculating the swipe direction. The CPU 103 receives from the input interface 102 a point (x0, y0) with which a finger of a user comes into contact and a point (x1, y1) from which the finger is separated, calculates the angle of the straight line passing through the two points, and specifies the angle as a swipe direction 1501. Using this method, it is possible to determine the 'swipe direction' 1501 by the user selecting two points ((x0, y0) then (x1, y1)) on the display unit 108 instead of swiping between two points, or by the user selecting a single point (x1, y1) (for example as shown in FIG. 18). Note that the method of calculating the swipe direction 1501 is not limited to the example, and may use, for example, the direction of the speed of the finger immediately before the finger is separated.

In S1408, the CPU 103 specifies the distance to a BLE-compatible device (in this case, communication apparatuses 1401 to 1403) in the vicinity from the information processing apparatus 101 and the direction of the BLE-compatible device with respect to the information processing apparatus 101, based on the detection results through BLE. The method of detecting the distance and the direction through BLE is as described above with reference to FIG. 7. The detection of the distance and the direction may be executed in S1408, or may be previously executed in a process before S1408. The CPU 103 may specify a device that provides a specific service (in this case, print service) from among a plurality of BLE-compatible devices in the vicinity, and may specify only the distance to the specified device. Specifically, the CPU 103 may specify advertisement information including information indicating a specific service from among respective pieces of advertisement information received from a plurality of BLE-compatible devices in the vicinity, and may specify only the distance to an apparatus of a transmission source of the specified advertisement information.

In S1409, the CPU 103 specifies the difference between the swipe direction specified in S1407 and the direction of the BLE-compatible device with respect to the information processing apparatus 101 specified in S1408. A plurality of BLE-compatible devices may be in the vicinity of the information processing apparatus 101, and the CPU 103 may specify a plurality of directions of the BLE-compatible devices with respect to the information processing apparatus 101 in S1407. In this case, the CPU 103 specifies the difference between each of the BLE-compatible devices with respect to the information processing apparatus 101 specified in S1408.

In S1410, the CPU 103 determines whether the difference specified in S1409 is less than a predetermined threshold. If YES, the CPU 103 goes to S1411. If NO, the CPU 103 executes S1406 again, and waits for a swipe operation. Alternatively, if NO, the display unit 108 may display a screen indicating that a device of a transmission target of a print job is not present in the swipe direction. When the CPU 103 has specified a plurality of differences in S1409, the CPU 103 may perform the determination only on one of the differences. For example, the CPU 103 may perform the determination only on the smallest difference among the plurality of differences, or only on the difference based on the direction with respect to the BLE device of which the distance to the information processing apparatus 101 is closest among the plurality of differences. Still alternatively, for example, when the CPU 103 has specified a plurality of differences in S1409, the CPU 103 may perform the determination only on the difference based on the direction with respect to a BLE device of a transmission source of advertisement information of which radio field intensity when received by the information processing apparatus 101 is largest among the plurality of differences.

Figure 17:
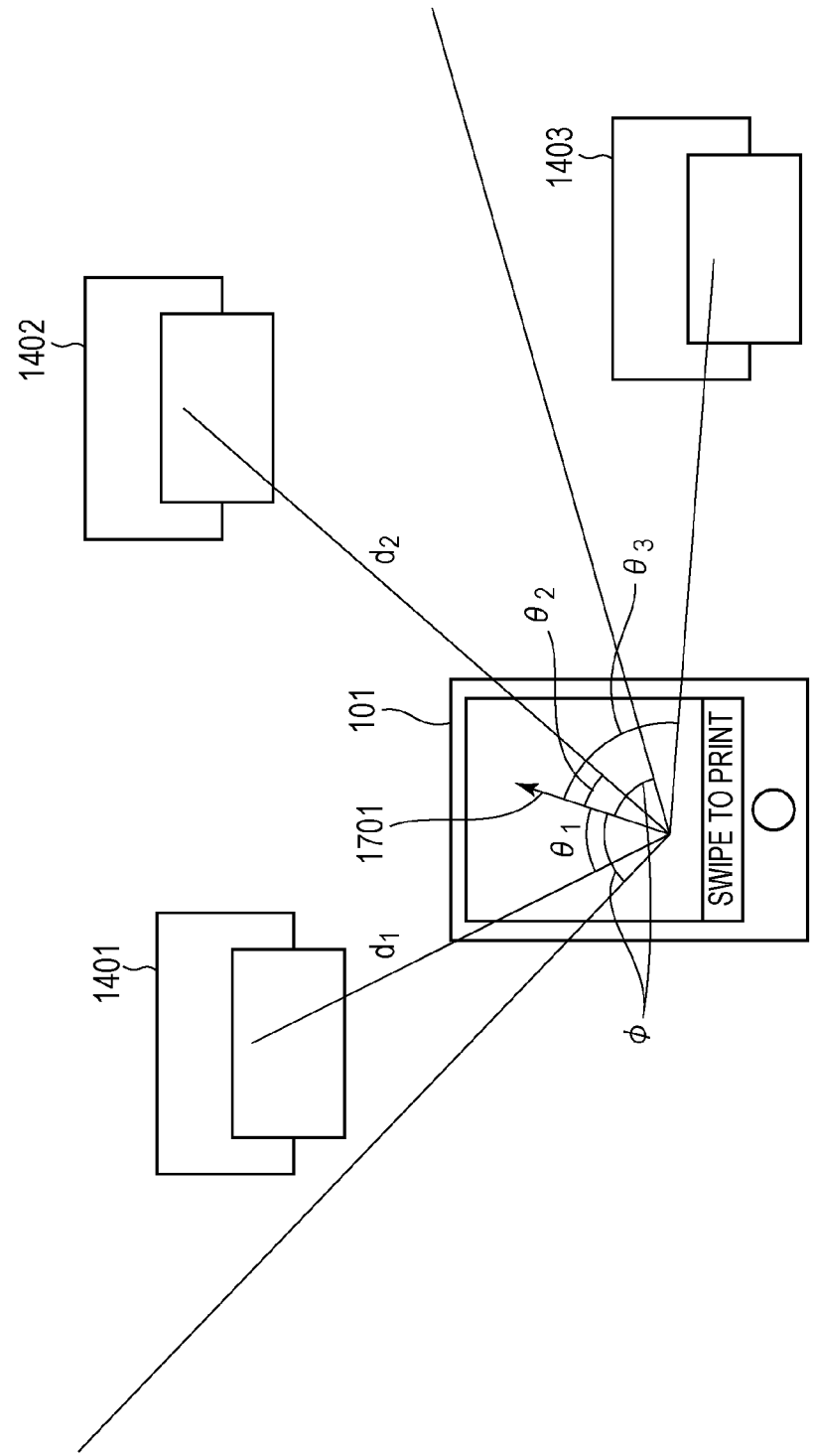
FIG. 17 illustrates a positional relationship between the information processing apparatus and the communication apparatus.

In S1411, the CPU 103 specifies the apparatus of the transmission target of the print job based on the determination result in S1409. Specifically, the CPU 103 specifies BLE-compatible devices corresponding to the differences that are less than or equal to the predetermined threshold, as candidates for the transmission target of the print job, and specifies one of the candidates as the apparatus of the transmission target of the print job. In this case, the CPU 103 specifies the BLE-compatible device corresponding to a smaller difference among the differences specified in S1409 as the apparatus of the transmission target of the print job. For example, it is assumed that the information processing apparatus 101 and the communication apparatuses 1401 to 1403 have the positional relationship as illustrated in FIG. 17, and the absolute values of the differences between a swipe direction 1701 and the communication apparatuses 1401, 1402, and 1403 are respectively $\theta_1$, $\theta_2$, and $\theta_3$. In this case, since threshold $\phi<\theta_3$, the communication apparatus 1403 is removed from the candidates for the transmission target of the print job, and the communication apparatuses 1401 and 1402 become candidates for the transmission target of the print job. Comparing the directions of the candidates with each other, since $\theta_1>\theta_2$, the communication apparatus 1402 is specified as the apparatus of the transmission target of the print job. Note that when the plurality of differences specified in S1409 are less than or equal to the predetermined threshold, and when the plurality of differences are the same value (or values close to each other), the apparatus of the transmission target of the print job may be specified based on an element other than the direction. In this case, the CPU 103 specifies the BLE-compatible device of which the distance specified in S1408 is smaller, as the apparatus of the transmission target of the print job. Specifically, for example, when $\theta_1=\theta_2$, and the distances between the information processing apparatus 101 and the communication apparatuses 1401 and 1402 are respectively $d_1$ and $d_2$, $d_1<d_2$ is established, and the communication apparatus 1401 is specified as the apparatus of the transmission target of the print job. Alternatively, the apparatus of the transmission target of the print job may be specified using an element other than the distance. For example, a plurality of BLE-compatible devices corresponding to the differences less than or equal to the predetermined threshold may be displayed in a list form, and the apparatus that is selected by the user from the list may be specified as the apparatus of the transmission target of the print job. For example, an apparatus suitable for print setting input by the user may be specified as the apparatus of the transmission target of the print job. For example, an apparatus without an error may be specified as the apparatus of the transmission target of the print job with a higher priority to an apparatus with an error.

In S1412, the CPU 103 generates a print job for printing the selected image based on the input print setting, and transmits the generated print job to the apparatus specified as the apparatus of the transmission target of the print job in S1411. The method of transmitting the print job is not particularly limited. For example, as illustrated in FIG. 10, a print job may be transmitted by handover to the apparatus of the transmission target of the print job. For another example, using information (IP address, etc.) included in advertisement information, the apparatus specified as the apparatus of the transmission target of the print job may be searched in the Wi-Fi network to which the information processing apparatus 101 belongs, and the print job may be transmitted to the found apparatus. The Wi-Fi network to which the information processing apparatus 101 belongs is, for example, a network including an access point to which the information processing apparatus 101 is connected. The apparatus is searched by, for example, broadcasting a predetermined command in the Wi-Fi network to which the information processing apparatus 101 belongs, and detecting whether responses to the broadcast includes a response to the apparatus to be searched. Then, the information processing apparatus 101 ends the process.

With such an embodiment, the user can cause the information processing apparatus 101 to specify the apparatus of the transmission target of data easily by an intuitive operation.

Note that, in general, when the information processing apparatus 101 transmits a job to another apparatus by the print application, information relating to an apparatus of a transmission target of a job is previously registered in the print application. With such registration, the information processing apparatus 101 is wirelessly connected to the apparatus of the transmission target of the job by Wi-Fi or the like, and can acquire information relating to the apparatus of the transmission target of the job (capability, identification information, or the like) via the wireless connection.

When the information relating to the apparatus of the transmission target of the job has been registered in the print application in this way, the information processing apparatus 101 can specify the apparatus of the transmission target of the job.

For example, when the information relating to the apparatus of the transmission target of the job has been registered in the print application, the information processing apparatus 101 does not have to execute the process of specifying the apparatus of the transmission target of the job in accordance with the swipe operation. Specifically, for example, if YES in S1404, the information processing apparatus 101 determines whether the information relating to the apparatus of the transmission target of the job has been registered in the print application. If it is determined that the information relating to the apparatus of the transmission target of the job has been registered in the print application, the information processing apparatus 101 goes to S1403. In contrast, if it is determined that the information relating to the apparatus of the transmission target of the job has not been registered in the print application, the information processing apparatus 101 does not include the instruction region 1603 and does not receive a swipe operation; however, displays a preview screen including a print button for instructing printing. When the print button is pressed by the user, the information processing apparatus goes to S1411, specifies the apparatus registered in the print application as the apparatus of the transmission target of the job, and in S1412, the print job is transmitted to the apparatus.

In the above description, the embodiment in which the print job is transmitted to the apparatus that is specified based on the swipe operation has been described; however, it is not limited to the embodiment. For example, the information to be transmitted according to the present disclosure may be information for switching the power supply state (power ON state and power OFF state) of the apparatus specified by the swipe operation. For another example, the information to be transmitted according to the present disclosure may be information or the like for causing the apparatus to be specified based on the swipe operation to execute an action other than printing. In other words, the apparatus to be specified based on the swipe operation may be an apparatus other than the apparatus that executes printing. The apparatus to be specified based on the swipe operation may be any one of various types of home electrical products. More specifically, for example, when the apparatus to be specified based on the swipe operation is an apparatus that controls a curtain, information to be transmitted according to the present disclosure may be information for executing an action of opening the curtain or an action of closing the curtain. For another example, when the apparatus to be specified based on the swipe operation is an air conditioner, the information may be information for executing a cooling function or a heating function of the air conditioner.

In the above description, the embodiment in which the user performs the swipe operation as an operation for the user designating the apparatus to be processed; however, it is not limited to the embodiment. For example, the user may designate the apparatus to be processed by an operation of swinging the information processing apparatus 101 in a direction in which the apparatus to be designated is located. Note that in which direction the information processing apparatus 101 is swung is detected, for example, by an acceleration sensor (not illustrated) included in the information processing apparatus 101.

In the above description, the embodiment in which the information is transmitted to the apparatus that is specified based on the swipe operation has been described; however, it is not limited to the embodiment. For example, it is assumed that each apparatus is associated with an account of a predetermined service (game service or the like) that is managed by an external server. It is also assumed that information can be exchanged between accounts managed in the external server, in the predetermined service. In this case, for example, the information processing apparatus 101 may perform control to transmit predetermined information from the account associated with the information processing apparatus 101 to an account associated with the apparatus that is specified based on the swipe operation. The predetermined information is, for example, information on an item that is used in the predetermined service. In this case, actually, information is exchanged not between the information processing apparatus 101 and the apparatus that is specified based on the swipe operation, but in the server that provides the predetermined service. The present disclosure may be applied to such an embodiment.

Second Embodiment

In this embodiment, an embodiment is described in which a user inputs a direction of an apparatus corresponding to a program that is installed in the information processing apparatus 101 or a direction of an apparatus corresponding to a program that is uninstalled from the information processing apparatus 101. It is assumed that the program that is installed or uninstalled according to the embodiment is a printer driver; however, it is not limited to the embodiment, and may be another program such as an application program.

In this embodiment, it is assumed that the information processing apparatus 101 includes a management program for installing or uninstalling the printer driver. The management program may be the above-described print application. The management program can receive an instruction for installation of the printer driver or an instruction for uninstallation of the printer driver from the user. A process when an instruction for installation of a printer driver is described below.

Figure 19:
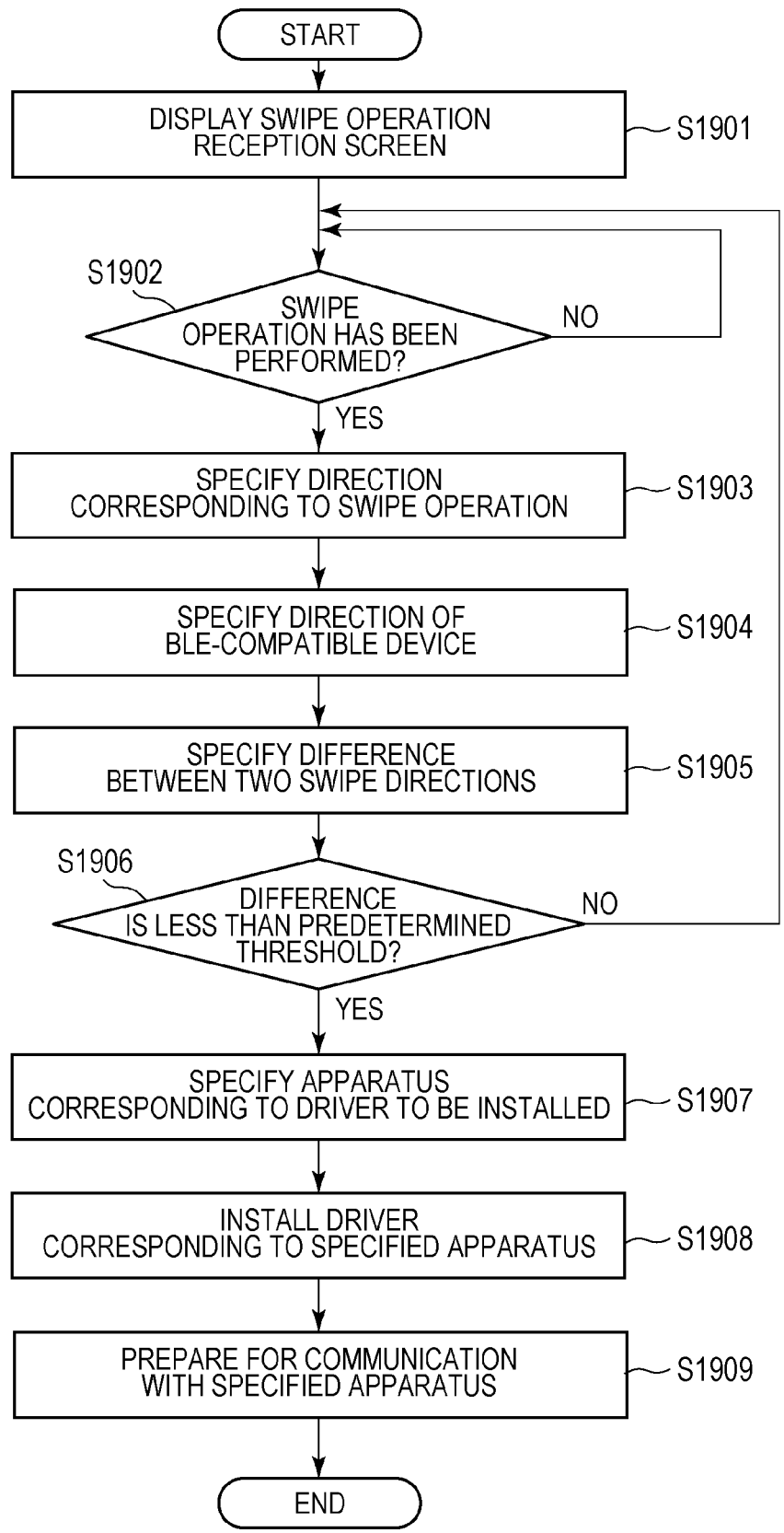
FIG. 19 is a flowchart indicating an installation process of a printer driver that is executed by the information processing apparatus.

FIG. 19 is a flowchart indicating an installation process of a printer driver that is executed by the information processing apparatus 101. The process is implemented by the CPU 103 loading a control program or a management program stored in the ROM 104 or an HDD (not illustrated) included in the information processing apparatus 101 into the RAM 105 and executing the control program. The process is started in a state in which the management program is actuated in the information processing apparatus 101 and the installation of the printer driver is instructed.

In S1901, the CPU 103 causes the display unit 108 to display a screen for receiving a swipe operation. The screen includes, for example, an instruction region to urge the user to perform a swipe operation and a direction guide to provide the user the direction of each BLE-compatible device present in the vicinity of the information processing apparatus 101.

In S1902, the CPU 103 determines whether the user has performed a swipe operation. If YES, the CPU 103 goes to S1903. If NO, the CPU 103 executes S1902 again, and waits for a swipe operation. The process is similar to the process in S1406.

In S1903, the CPU 103 analyzes the swipe operation performed by the user and specifies the swipe direction. The process is similar to the process in S1407.

In S1904, the CPU 103 specifies the distance to BLE-compatible devices (in this case, communication apparatuses 1401 to 1403) in the vicinity from the information processing apparatus 101 and the direction of the BLE-compatible device with respect to the information processing apparatus 101, based on the detection results through BLE. The process is similar to the process in S1408.

In S1905, the CPU 103 specifies the difference between the swipe direction specified in S1903 and the direction of the BLE-compatible device with respect to the information processing apparatus 101 specified in S1904. The process is similar to the process in S1409.

In S1906, the CPU 103 determines whether the difference specified in S1905 is less than a predetermined threshold. If YES, the CPU 103 goes to S1907. If NO, the CPU 103 executes S1902 again, and waits for a swipe operation. The process is similar to the process in S1410.

In S1907, the CPU 103 specifies the apparatus corresponding to the printer driver to be installed, based on the determination result in S1906. The method of specification in the process is similar to the method of specification in the process in S1411.

In S1908, the CPU 103 installs the printer driver corresponding to the apparatus specified in S1907, into the information processing apparatus 101. Specifically, for example, the CPU 103 downloads the printer driver corresponding to the apparatus specified in S1907 from a specific server via the Internet, and installs the downloaded printer driver. The method of installing the printer driver is not limited to the method. For example, the CPU 103 may select a printer driver corresponding to the apparatus specified in S1907 from among programs stored in an external memory attached to the information processing apparatus 101, and may install the printer driver. For another example, the CPU 103 may search the apparatus specified in S1907 in the Wi-Fi network to which the information processing apparatus 101 belongs, may receive the printer driver from the found apparatus, and may install the printer driver. For still another example, the CPU 103 may make Wi-Fi connection with the apparatus specified in S1907 by handover as described with reference to FIG. 10, may receive the printer driver via the Wi-Fi connection, and may install the printer driver. When an instruction for uninstalling the printer driver is received from a user through the management program, in S1908, the process of uninstalling the printer driver corresponding to the apparatus specified in S1907 from the information processing apparatus 101 is performed.

In S1909, the CPU 103 prepares for communication with the apparatus specified in S1907. Specifically, for example, the CPU 103 searches the apparatus specified in S1907 in the Wi-Fi network to which the information processing apparatus 101 belongs, and establishes Wi-Fi connection with the found apparatus. Thus, the information processing apparatus 101 can transmit a print job using the printer driver to the apparatus specified in S1907. For example, the CPU 103 execute a pairing process with respect to the apparatus specified in S1907 through BLE. Thus, the information processing apparatus 101 can perform handover with the apparatus specified in S1907.

With such an embodiment, the user can cause the information processing apparatus 101 to specify the apparatus corresponding to the program to be installed or uninstalled, easily with an intuitive operation.

In the above description, the embodiment in which the information processing apparatus 101 specifies the apparatus corresponding to the program to be installed or uninstalled has been described; however, it is not limited to the embodiment. For example, an embodiment in which the information processing apparatus 101 specifies the apparatus corresponding to a program to be updated by a swipe operation may be employed.

Other Embodiments

The present disclosure can be implemented through a process of supplying a program that provides at least one function of the above-described embodiments to a system or an apparatus via a network or a storage medium and causing at least one processor in a computer of the system or the apparatus to read and execute the program. Alternatively, the present disclosure can be implemented using a circuit (for example, application specific integrated circuit (ASIC)) that provides at least one function.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-111368, filed Jun. 14, 2019, which is hereby incorporated by reference herein in its entirety.

What is claimed is:

1. An information processing apparatus comprising:
one or more processors; and
at least one memory storing executable instructions, which when executed by the one or more processors, cause the information processing apparatus to:
specify a direction of a position of a communication apparatus with respect to a position of the information processing apparatus based on communication between the information processing apparatus and the communication apparatus through a predetermined communication method;
receive a predetermined operation from a user;
specify a direction corresponding to the received predetermined operation;
specify the communication apparatus corresponding to the specified direction corresponding to the predetermined operation from among a plurality of the communication apparatuses present in a vicinity of the information processing apparatus based on the specified direction of the position of the communication apparatus and the specified direction corresponding to the predetermined operation;
execute a process relating to the communication apparatus corresponding to the specified direction corresponding to the predetermined operation, wherein the process relating to the communication apparatus corresponding to the specified direction corresponding to the predetermined operation is a process of transmitting predetermined information to the communication apparatus corresponding to the specified direction corresponding to the predetermined operation;
receive connection information for connection through another communication method different from the predetermined communication method from the communication apparatus corresponding to the specified direction corresponding to the predetermined operation, through the predetermined communication method; and
establish connection through the another communication method between the information processing apparatus and the communication apparatus corresponding to the specified direction corresponding to the predetermined operation using the connection information,
wherein the process relating to the communication apparatus corresponding to the specified direction corresponding to the predetermined operation is a process of transmitting the predetermined information to the communication apparatus corresponding to the specified direction corresponding to the predetermined operation via the established connection through the another communication method.

2. The information processing apparatus according to claim 1, wherein the predetermined operation is a swipe operation with respect to a screen that is displayed by the information processing apparatus.

3. The information processing apparatus according to claim 1, wherein the executable instructions, when executed by the one or more processors, further comprising cause the information processing apparatus to:

register information on an apparatus of a transmission target of the predetermined information; and
receive an instruction for transmission of the predetermined information from a user,
wherein, when information on an apparatus of a transmission target of the predetermined information has been registered, the predetermined information is transmitted to an apparatus corresponding to the registered information based on that the instruction for the transmission of the predetermined information has been received, and
wherein, when information on an apparatus of a transmission target of the predetermined information has not been registered, the predetermined information is transmitted to the communication apparatus corresponding to the specified direction corresponding to the predetermined operation based on that the instruction for the transmission of the predetermined information has been received.

4. The information processing apparatus according to claim 1, wherein the predetermined information is information for causing the communication apparatus to execute a predetermined action.

5. The information processing apparatus according to claim 4, wherein the predetermined action is execution of printing.

6. The information processing apparatus according to claim 1, wherein the process relating to the communication apparatus corresponding to the specified direction corresponding to the predetermined operation is a process of installing a program corresponding to the communication apparatus corresponding to the specified direction corresponding to the predetermined operation into the information processing apparatus.

7. The information processing apparatus according to claim 1, wherein the process relating to the communication apparatus corresponding to the specified direction corresponding to the predetermined operation is a process of transmitting predetermined information to an account that is managed in an external server and that corresponds to the communication apparatus corresponding to the specified direction corresponding to the predetermined operation.

8. The information processing apparatus according to claim 1, wherein, when a plurality of the communication apparatuses corresponding to the specified direction corresponding to the predetermined operation are specified, a process relating to the communication apparatus at a closer distance to the information processing apparatus from among the plurality of communication apparatuses corresponding to the specified direction corresponding to the predetermined operation is executed.

9. The information processing apparatus according to claim 8, wherein the executable instructions, when executed by the one or more processors, further cause the information processing apparatus to:
specify a distance between the information processing apparatus and the communication apparatus based on communication between the information processing apparatus and the communication apparatus through the predetermined communication method.

10. The information processing apparatus according to claim 1, further comprising:
a display,
wherein the executable instructions, when executed by the one or more processors, further cause the information processing apparatus to display an icon indicating the specified direction of the position of the communication apparatus.

11. The information processing apparatus according to claim 1, wherein the predetermined communication method is Bluetooth low energy.

12. The information processing apparatus according to claim 11, wherein the predetermined communication method is Bluetooth low energy included in standard of Bluetooth5.1.

13. A method of controlling an information processing apparatus, the method comprising:
specifying a direction of a position of a communication apparatus with respect to a position of the information processing apparatus based on communication between the information processing apparatus and the communication apparatus through a predetermined communication method;
receiving a predetermined operation from a user;
specifying a direction corresponding to the received predetermined operation;
specifying the communication apparatus corresponding to the specified direction corresponding to the predetermined operation from among a plurality of the communication apparatuses present in a vicinity of the information processing apparatus based on the specified direction of the position of the communication apparatus and the specified direction corresponding to the predetermined operation;
executing a process relating to the communication apparatus corresponding to the specified direction corresponding to the predetermined operation, wherein the process relating to the communication apparatus corresponding to the specified direction corresponding to the predetermined operation is a process of transmitting predetermined information to the communication apparatus corresponding to the specified direction corresponding to the predetermined operation;
receiving connection information for connection through another communication method different from the predetermined communication method from the communication apparatus corresponding to the specified direction corresponding to the predetermined operation, through the predetermined communication method; and
establishing connection through the another communication method between the information processing apparatus and the communication apparatus corresponding to the specified direction corresponding to the predetermined operation using the connection information,
wherein the process relating to the communication apparatus corresponding to the specified direction corresponding to the predetermined operation is a process of transmitting the predetermined information to the communication apparatus corresponding to the specified direction corresponding to the predetermined operation via the established connection through the another communication method.

14. An information processing apparatus comprising:
one or more processors; and
at least one memory storing executable instructions, which when executed by the one or more processors, cause the information processing apparatus to:
specify a direction of a position of a communication apparatus with respect to a position of the information processing apparatus based on communication between the information processing apparatus and the communication apparatus through a predetermined communication method;
receive a predetermined operation from a user;
specify a direction corresponding to the received predetermined operation;
specify the communication apparatus corresponding to the specified direction corresponding to the predetermined operation from among a plurality of the communication apparatuses present in a vicinity of the information processing apparatus based on the specified direction of the position of the communication apparatus and the specified direction corresponding to the predetermined operation;
execute a process relating to the communication apparatus corresponding to the specified direction corresponding to the predetermined operation, wherein the process relating to the communication apparatus corresponding to the specified direction corresponding to the predetermined operation is a process of transmitting predetermined information to the communication apparatus corresponding to the specified direction corresponding to the predetermined operation;
register information on an apparatus of a transmission target of the predetermined information; and
receive an instruction for transmission of the predetermined information from a user,
wherein, when information on an apparatus of a transmission target of the predetermined information has been registered, the predetermined information is transmitted to an apparatus corresponding to the registered information based on that the instruction for the transmission of the predetermined information has been received, and
wherein, when information on an apparatus of a transmission target of the predetermined information has not been registered, the predetermined information is transmitted to the communication apparatus corresponding to the specified direction corresponding to the predetermined operation based on that the instruction for the transmission of the predetermined information has been received.

* * * * *